(12) United States Patent
Tee

(10) Patent No.: US 10,700,920 B2
(45) Date of Patent: Jun. 30, 2020

(54) SYSTEM AND METHODS FOR DECOMPOSING EVENTS FROM MANAGED INFRASTRUCTURES THAT INCLUDES A FLOATING POINT UNIT

(71) Applicant: Moogsoft, Inc., San Francisco, CA (US)

(72) Inventor: Philip Tee, San Francisco, CA (US)

(73) Assignee: Moogsoft, Inc., San Francisco, CA (US)

( * ) Notice: Subject to any disclaimer, the term of this patent is extended or adjusted under 35 U.S.C. 154(b) by 999 days.

(21) Appl. No.: 15/213,862

(22) Filed: Jul. 19, 2016

(65) Prior Publication Data
US 2016/0330066 A1 Nov. 10, 2016

Related U.S. Application Data

(63) Continuation-in-part of application No. 15/213,752, filed on Jul. 19, 2016, now Pat. No. 10,237,119, which is a continuation-in-part of application No. 14/606,946, filed on Jan. 27, 2015, now Pat. No. 10,044,549, which is a continuation-in-part of application No. 14/605,872, filed on Jan. 26, 2015, now Pat. No. 10,146,851, which is a continuation-in-part of application No. 14/325,575,
(Continued)

(51) Int. Cl.
| | |
|---|---|
| G06F 15/18 | (2006.01) |
| H04L 12/24 | (2006.01) |
| H04L 29/08 | (2006.01) |
| H04L 12/58 | (2006.01) |
| G06Q 10/06 | (2012.01) |

(52) U.S. Cl.
CPC ........ H04L 41/0604 (2013.01); G06Q 10/06 (2013.01); H04L 41/0631 (2013.01); H04L 41/16 (2013.01); H04L 51/16 (2013.01); H04L 67/22 (2013.01); H04L 67/26 (2013.01)

(58) Field of Classification Search
CPC ................................................... G06N 20/00
USPC ...................................................... 706/15, 45
See application file for complete search history.

(56) References Cited

U.S. PATENT DOCUMENTS

| | | | |
|---|---|---|---|
| 5,341,142 | A | 8/1994 | Reis |
| 6,195,103 | B1 | 2/2001 | Stewart |
| (Continued) | | | |

FOREIGN PATENT DOCUMENTS

| | | |
|---|---|---|
| EP | 0171190 | 2/1986 |
| EP | 0271255 | 6/1988 |
| EP | 2112603 | 10/2009 |

OTHER PUBLICATIONS

International Search Report dated Jul. 6, 2015 for PCT Application No. PCT/US2015/028004.
(Continued)

*Primary Examiner* — David R Vincent
(74) *Attorney, Agent, or Firm* — Paul Davis

(57) ABSTRACT

An event clustering system and associated methods include a feedback signalizer functor that responds to user interactions with already formed situations. The system and method then learns how to replicate the same situation when new alerts reoccur, or, creates similar situations. The feedback signalizer functor is a supervised machine learning approach to train a signalizer functor to reproduce a situation at varying degrees of precision.

50 Claims, 27 Drawing Sheets

Related U.S. Application Data filed on Jul. 8, 2014, now Pat. No. 10,007,716, which is a continuation-in-part of application No. 14/325,521, filed on Jul. 8, 2014, now Pat. No. 10,013,476, which is a continuation-in-part of application No. 14/262,890, filed on Apr. 28, 2014, now Pat. No. 9,535,973, which is a continuation-in-part of application No. 14/262,884, filed on Apr. 28, 2014, now Pat. No. 9,607,075, which is a continuation-in-part of application No. 14/262,870, filed on Apr. 28, 2014, now Pat. No. 9,529,890, which is a continuation-in-part of application No. 14/262,861, filed on Apr. 28, 2014, now Pat. No. 9,607,074.

(60) Provisional application No. 62/254,441, filed on Nov. 12, 2015, provisional application No. 61/816,867, filed on Apr. 29, 2013.

(56) References Cited

U.S. PATENT DOCUMENTS

| | | |
|---|---|---|
| 6,323,846 B1 | 11/2001 | Westerman |
| 6,438,705 B1 | 8/2002 | Chao |
| 6,570,557 B1 | 5/2003 | Westerman |
| 6,677,932 B1 | 1/2004 | Westerman |
| 6,888,536 B2 | 5/2005 | Westerman |
| 7,124,060 B1 | 10/2006 | Eriksson |
| 7,137,100 B2 | 11/2006 | Iborra |
| 7,603,458 B1 | 10/2009 | Sexton |
| 7,614,008 B2 | 11/2009 | Ording |
| 7,649,853 B1 | 1/2010 | Nucci |
| 7,653,883 B2 | 1/2010 | Hotelling |
| 7,657,849 B2 | 2/2010 | Chaudhri |
| 7,663,607 B2 | 2/2010 | Hotelling |
| 7,844,914 B2 | 11/2010 | Andre |
| 7,945,658 B1 | 5/2011 | Nucci |
| 8,006,002 B2 | 8/2011 | Kalayjian |
| 8,140,523 B2 | 3/2012 | Fakhouri |
| 8,176,475 B2 | 5/2012 | Kosche |
| 8,239,784 B2 | 8/2012 | Hotelling |
| 8,279,180 B2 | 10/2012 | Hotelling |
| 8,356,086 B2 | 1/2013 | Liu |
| 8,375,068 B1 | 2/2013 | Platt |
| 8,381,135 B2 | 2/2013 | Hotelling |
| 8,479,122 B2 | 7/2013 | Hotelling |
| 8,600,430 B2 | 12/2013 | Herz |
| 8,706,683 B1 | 4/2014 | Todd |
| 8,738,972 B1 | 5/2014 | Bakman |
| 8,745,191 B2 | 6/2014 | Raleigh |
| 8,762,285 B2 | 6/2014 | Davis |
| 8,819,145 B1 | 8/2014 | Gailloux |
| 8,832,498 B1 | 9/2014 | Jain |
| 8,935,709 B2 | 1/2015 | Kache |
| 2002/0107958 A1 | 8/2002 | David, II |
| 2004/0111438 A1 | 6/2004 | Chitrapura |
| 2004/0260662 A1* | 12/2004 | Staelin ............... G06N 3/08 706/16 |
| 2005/0060643 A1 | 3/2005 | Glass |
| 2005/0081080 A1 | 4/2005 | Bender |
| 2005/0256901 A1 | 11/2005 | Banks |
| 2005/0261879 A1* | 11/2005 | Shrivastava ........ G06F 11/0715 702/186 |
| 2006/0026536 A1 | 2/2006 | Hotelling |
| 2006/0033724 A1 | 2/2006 | Chaudhri |
| 2006/0080466 A1 | 4/2006 | Yamaguchi |
| 2006/0112175 A1 | 5/2006 | Sellers |
| 2006/0149990 A1 | 7/2006 | S. |
| 2006/0197753 A1 | 9/2006 | Hotelling |
| 2007/0030824 A1 | 2/2007 | Ribaudo |
| 2008/0189718 A1 | 8/2008 | Gulley |
| 2009/0063469 A1 | 3/2009 | Gross |
| 2009/0109872 A1 | 4/2009 | Skubacz |
| 2009/0125916 A1 | 5/2009 | Lu |
| 2009/0177484 A1 | 7/2009 | Davis |
| 2009/0204938 A1 | 8/2009 | Schindler |
| 2009/0271433 A1 | 10/2009 | Perronnin |
| 2009/0299809 A1 | 12/2009 | Dettori |
| 2010/0162396 A1 | 6/2010 | Liu |
| 2011/0010399 A1 | 1/2011 | Leary |
| 2011/0043689 A1 | 2/2011 | Cobb |
| 2011/0064268 A1 | 3/2011 | Cobb |
| 2011/0107148 A1 | 5/2011 | Franklin |
| 2011/0225159 A1 | 9/2011 | Murray |
| 2012/0008836 A1 | 1/2012 | Bobbitt |
| 2012/0041575 A1 | 2/2012 | Maeda |
| 2012/0109882 A1 | 5/2012 | Bouse |
| 2012/0117254 A1 | 5/2012 | Ehrlich |
| 2012/0150860 A1 | 6/2012 | Bhamidipati |
| 2012/0185418 A1 | 7/2012 | Capman |
| 2012/0216243 A1 | 8/2012 | Gill |
| 2012/0233417 A1 | 9/2012 | Kalach |
| 2012/0246718 A1 | 9/2012 | Spears |
| 2012/0284790 A1 | 11/2012 | Bhargava |
| 2013/0007093 A1 | 1/2013 | Knox |
| 2013/0024166 A1 | 1/2013 | Herzog |
| 2013/0096835 A1 | 4/2013 | Chok |
| 2013/0097464 A1* | 4/2013 | Ahmad ............... G06F 9/45558 714/47.1 |
| 2013/0159502 A1 | 6/2013 | Thompson |
| 2013/0198188 A1 | 8/2013 | Huang |
| 2013/0268839 A1 | 10/2013 | Lefebvre |
| 2013/0298192 A1 | 11/2013 | Kumar |
| 2013/0298244 A1 | 11/2013 | Kumar |
| 2014/0068629 A1 | 3/2014 | Boller |
| 2014/0172371 A1 | 6/2014 | Zhu |
| 2014/0310243 A1 | 10/2014 | Mcgee |
| 2015/0254513 A1 | 9/2015 | Mansour |
| 2015/0281369 A1 | 10/2015 | Venolia |

OTHER PUBLICATIONS

International Search Report dated Jul. 14, 2015 for PCT Application No. PCT/US2015/027914.

International Search Report dated Jul. 10, 2015 for PCT Application No. PCT/US2015/28022.

Creating Pentaho Dashboards dated Jan. 3, 2014, Available at: http://docs.huihoo.com/pentaho/pentaho-business-analytics/4.1/dashboard_guide.pdf.

Yan Chen, et al., Autonomous Mining for Alarm Correlation Patterns based on Time-Shift Similarity Clustering in Manufacturing System, Prognostics and Health Management (PHM), 2011 IEEE conference on, IEEE, Jun. 20, 2011, pp. 1-8.

Joshua Ojo Nehinbe, Log Analyzer for Network Forensics and Incident Reporting, Intelligent Systems, Modelling and Simulation (ISMS), 2010 International Conference on, IEEE, Piscaraway, NJ, USA, Jan. 27, 2010, pp. 356-361.

* cited by examiner

Display Query View: ZOK_QN
Query View ID:* [ZOK_QN]         496
Description: [XC Quality Notification]   Quick Info Text: [ ]
Table ID: [ ]                    Chart ID: [ZOK_XC1]
Enable Personalization: [X]
Private: [X]                     Owner: [KREINDLINA]

| Queries | | |
|---|---|---|
| Query ID | Table View | Description |
| ZOK_QN | TABLE_ZOK_QN | standard query generated from ZOK_QN |
| | | |
| | | |

198

| Input Fields | Output Fields | Layout for Quick View | Subject-Based View Assignments | Charts Views | Authorization | | |
|---|---|---|---|---|---|---|---|
| Query ID | Query Field ID | Description of Query Field | Sequence | Allow Aggr | Sequence | Sorting | Sort Seq. |
| ZOK_QN | CODE_TEXT | Short Text for Code (up to 40 Characters in Length) | 1 | | 1 | - | |
| ZOK_QN | ZDAM_NUM | Number of damages | 2 | | | - | |
| ZOK_QN | D_CAT_TYP | Catalog Type Problem | 3 | | 2 | - | |
| ZOK_QN | D_CODE | Problem or Damage Code | 4 | | | - | |

| Save | Edit | Close | Read Only | Save As | Refresh | Check Consistency | Test | Delete |

Query View ID:* ZOK_QN
Chart ID:* ZOK_XC1
Description:
Technology:* Xcelsius Dashboard        Quick Info Text:
                                       Chart Type: Display Xcelsius Flash Island

512

Xcelsius Dashboards

Folder: /sap/public/buisnessuite/bcv
File Path: /sap/public/buisnessuite/bcv/ZOK_7.swf
Name of SWF File: ZOK_7.swf

514

Upload file to repository

Mapping to Xcelsius Interface

Generate XC Fields

| Xcelsius Field | Query ID | Query Field ID |
|---|---|---|
| DAMAGES | ZOK_QN | ZDAM_NUM |
| LABELS | ZOK_QN | CODE_TEXT |

*FIG. 20*

SYSTEM AND METHODS FOR DECOMPOSING EVENTS FROM MANAGED INFRASTRUCTURES THAT INCLUDES A FLOATING POINT UNIT

CROSS-REFERENCE TO RELATED APPLICATIONS

This application claims the priority benefit of all of the following: which is a Continuation-In-Part of patent application Ser. No. 15/213,752, filed Jul. 19, 2016, which is a U.S. Provisional Patent Application No. 62/254,441, filed Nov. 12, 2015. This application is a Continuation-In-Part of patent application Ser. No. 14/606,946, filed Jan. 27, 2015, which is a Continuation-In-Part of patent application Ser. No. 14/605,872, filed Jan. 26, 2015, which is a Continuation-In-Part of patent application Ser. No. 14/325,575, filed Jul. 8, 2014, which is a Continuation-In-Part of patent application Ser. No. 14/325,521, filed Jul. 8, 2014, which is a Continuation-In-Part of patent application Ser. No. 14/262,890, filed Apr. 28, 2014, which is a Continuation-In-Part of patent application Ser. No. 14/262,884, filed Apr. 28, 2014, which is a Continuation-In-Part of patent application Ser. No. 14/262,870, filed Apr. 28, 2014, which claims benefit to U.S. Patent Application 61/816,867, filed Apr. 29, 2013. Patent application Ser. No. 14/262,870, which is a Continuation-In-Part of patent application Ser. No. 14/262,861, filed Apr. 28, 2014, for which applications are fully incorporated herein by reference.

BACKGROUND

1. Field of the Invention

This invention relates generally to event/message processing, and more particularly to clustering messages/events received from infrastructure and includes a feedback signalizer.

2. Description of the Related Art

The World Wide Web is increasingly becoming a more important and more frequently used form of communication between people. The primary form of web-based communication is electronic mail. Other forms of communication are also used, however, such as news groups, discussion groups, bulletin boards, voice-over IP, and so on. Because of the vast amount of information that is available on the web, it can be difficult for a person to locate information that may be of interest. For example, a person who receives hundreds of electronic mail messages/events from infrastructure a day may find it impractical to take the time to store the messages/events from infrastructure in folders of the appropriate topic. As a result, it may be difficult for the person to later find and retrieve all messages/events from infrastructure related to the same topic. A similar situation arises when a person tries to locate news groups or discussion groups of interest. Because there may be no effective indexing of these groups, it can be difficult for the person to find groups related to the topic of interest.

Some attempts have been made to help the retrieval of information of interest by creating web directories that provide a hierarchical organization of web-based information. The process of creating the directories and deciding into which directory a particular piece of information (e.g., a news group) should go is typically not automated. Without an automated approach it is impractical to handle the massive amounts of web-based information that are being generated on a daily basis. Moreover, because a person may not be fully aware of the entire web directory hierarchy or may not fully understand the semantics of information, the person may place the information in a directory that is not the most appropriate, making later retrieval difficult. It would be desirable to have an automated technique that would help organize such information.

The advent of global communications networks such as the Internet has provided alternative forms of communicating worldwide. Additionally, it has increased the speed at which communications can be sent and received. Not only can written or verbal messages/events from infrastructure be passed through the Internet, but documents, sound recordings, movies, and pictures can be transmitted by way of the Internet as well. As can be imagined, inboxes are being inundated with countless items. The large volume can more than difficult to manage and/or organize for most users.

In particular, a few of the more common activities that a user performs with respect to email, for example, are: sorting of new messages/events from infrastructure, task management of using messages/events from infrastructure that can serve as reminders, and retrieval of past messages/events from infrastructure. Retrieval of recent messages/events from infrastructure can be more common than older messages/events from infrastructure. Traditional systems employed today support at least some aspect of these three activities using folders such as an inbox, task-oriented folders, and user-created folders, respectively. However, this as well as other existing approaches present several problems. The folders make stark divisions between the three activities which are not conducive or coincident with user behavior, in general. For example, tasks are not visible to the user, or rather are "out of sight, out of mind", and thus can be easily, if not frequently, neglected, overlooked, or forgotten. In addition, in many current systems any given message can only be in one folder at a time. Hence, the particular message cannot serve multiple activities at once. Other current systems have attempted to ease these problems; however, they fall short as well for similar reasons.

A user can communicate using one or more different messaging techniques known in the art: email, instant messaging, social network messaging, cellular phone messages/events from infrastructure, etc. Typically, the user can accumulate a large collection of messages/events from infrastructure using one or more of these different messaging techniques. This user collection of messages/events from infrastructure can be presented as a large collection of messages/events from infrastructure with limited options of grouping or clustering the messages/events from infrastructure.

One way of grouping messages/events from infrastructure is to group multiple emails into an email thread. An email thread is a collection of emails that are related based on the subjects of the emails. For example, one user sends an email to one or more users based on a given subject. Another user replies to that email and a computer would mark those two emails as belonging to a thread. Another way for grouping messages/events from infrastructure is put the messages/events from infrastructure into folders. This can be done manually by the user or can be done automatically by the user setting up rules for message processing.

Document clustering and classification techniques can provide an overview or identify a set of documents based upon certain criteria, which amplifies or detects certain patterns within its content. In some applications these techniques lead to filtering unwanted email and in other applications they lead to effective search and storage strategies. An identification strategy may for example divide documents into clusters so that the documents in a cluster are similar to one another and are less similar to documents in other clusters, based on a similarity measurement. One refers to the process of clustering and classification as labeling. In demanding applications labeling can greatly improve the efficiency of an enterprise, especially for storage and retrieval applications, provided that it is stable, fast, efficient, and accurate.

Users of information technology must effectively deal with countless unwanted emails, unwanted text messages/events from infrastructure and crippling new viruses and worms every day. This largely unnecessarily high volume of network traffic decreases worker productivity and slows down important network applications. One of the most serious problems in today's digital economy has to do with the increasing volume of spam. As such, recipients of email as well as the service providers need effective solutions to reduce its proliferation on the World Wide Web. However, as spam detection becomes more sophisticated, spammers invent new methods to circumvent detection. For example, one prior art methodology provides a centralized database for maintaining signatures of documents having identified attributes against which emails are compared, however, spammers now modify the content of their email either slightly or randomly such that the message itself may be intelligible, but it evades detection under various anti-spam filtering techniques currently employed.

At one time, at least 30 open relays dominated the world, bursting messages/events from infrastructure at different rates and different levels of structural variation. Because certain types of email mutate or evolve, as exemplified by spam, spam-filtering detection algorithms must constantly adjust to be effective. In the case of spam email, for example, the very nature of the spam corpus undergoes regime changes. Therefore, clustering optimality depends heavily on the nature of the data corpus and the changes it undergoes.

Decomposing a traffic matrix has proven to be challenging. In one method, a matrix factorization system is used to extract application dependencies in an enterprise network, a cloud-based data center, and other like data centers, using a temporal global application traffic graph dynamically constructed over time and spatial local traffic observed at each server of the data center. The data center includes a plurality of servers running a plurality of different applications, such as e-commerce and content delivery. Each of the applications has a number of components such as a, web server, application server and database server, in the application's dependency path, where one or more of the components are shared with one or more of the other applications.

Because such data centers typically host a large number of multi-tier applications, the applications requests are overlapped, both in the spatial and temporal domains, making it very difficult for conventional pair wise statistical correlation techniques to correctly extract these interleaved but independent applications. A matrix-based representation of application traffic is used which captures both system snapshots and their historical evolution. The system and method decomposes a matrix representation of application graphs into small sub-graphs, each representing a single application.

The number of applications is usually unknown a priori due to interleaving and overlapping application requests, which further imposes a challenge to discovery of the individual application sub-graphs. In one prior method and system, the number of applications is determined using low rank matrix estimation either with singular value decomposition or power factorization based solvers, under complete and incomplete traffic data scenarios, with theoretical bound guarantee.

Traffic tapping from switches is limited by the capability of switches as well as the monitoring hosts. A switch typically can mirror only a few ports at the same time. In addition, monitoring data collected over multiple switches, each with multiple ports may result in high-volume aggregate network traffic and potentially packet loss. Both cases lead to significant loss in the monitoring data.

One system and method to overcome this problem utilizes historical data to provide redundancy and employs power factorization based techniques to provide resilience to data loss and estimation errors. In one system and method, a distributed network monitors and centralizes data processing to determine application dependency paths in a data center.

The majority of current service management solutions are rule based. The concept behind rule-based systems is that you start with the system you are monitoring, analyze and model it, turning it into a series of business logic rules that respond to events as they occur. For example, in response to some logged text, you apply logic that turns the text into a database record to which you apply more logic that turns it into an alert, before applying again more logic to connect the alert to a trouble ticket.

There is a need for improved event clustering systems, and their associated methods. There is a further need for event clustering systems, and their associated methods, that use a floating point unit.

SUMMARY

An object of the present invention is to provide an event clustering system that includes a feedback signalizer.

Another object of the present invention is to provide an event clustering system that includes a signalizer engine and a floating point unit.

A further object of the present invention is to provide an event clustering system that includes a floating point unit with a signalizing event analyzer that responds to user interactions with already formed situations, and then learns how to replicate the same situation when new alerts reoccur, or, creates similar situations.

Yet another object of the present invention is to provide an event clustering system that includes a feedback signalizer that that is a supervised machine learning approach to train to reproduce a situation at varying degrees of precision which includes a floating point unit.

These and other objects of the present invention are achieved in an event clustering system that has an extraction engine in communication with a managed infrastructure. A signalizer engine includes one or more of an NMF engine, a k-means clustering engine and a topology proximity engine. The signalizer engine determines one or more common characteristics or features from events. The signalizer engine uses the common features of events to produce clusters of events relating to the failure or errors in the managed infrastructure. Membership in a cluster indicates a common factor of the events that is a failure or an actionable problem in the physical hardware managed infrastructure directed to supporting the flow and processing of information. A floating point unit (FPU) performs floating point calculations. In response to production of the clusters one or more physical changes in a managed infrastructure hardware is made, where the hardware supports the flow and processing of information.

BRIEF DESCRIPTION OF THE DRAWINGS

FIGS. 13(a) and 13(b) illustrate one embodiment of a dashboard associated with a situational room.

FIG. 16 is a screen display of the dashboard external interface screen that may allow another software program to transmit data in the data range.

FIG. 20 illustrates one embodiment of a screen display showing the data mapping for the dashboard configuration screen.

DETAILED DESCRIPTION

Figure 1:
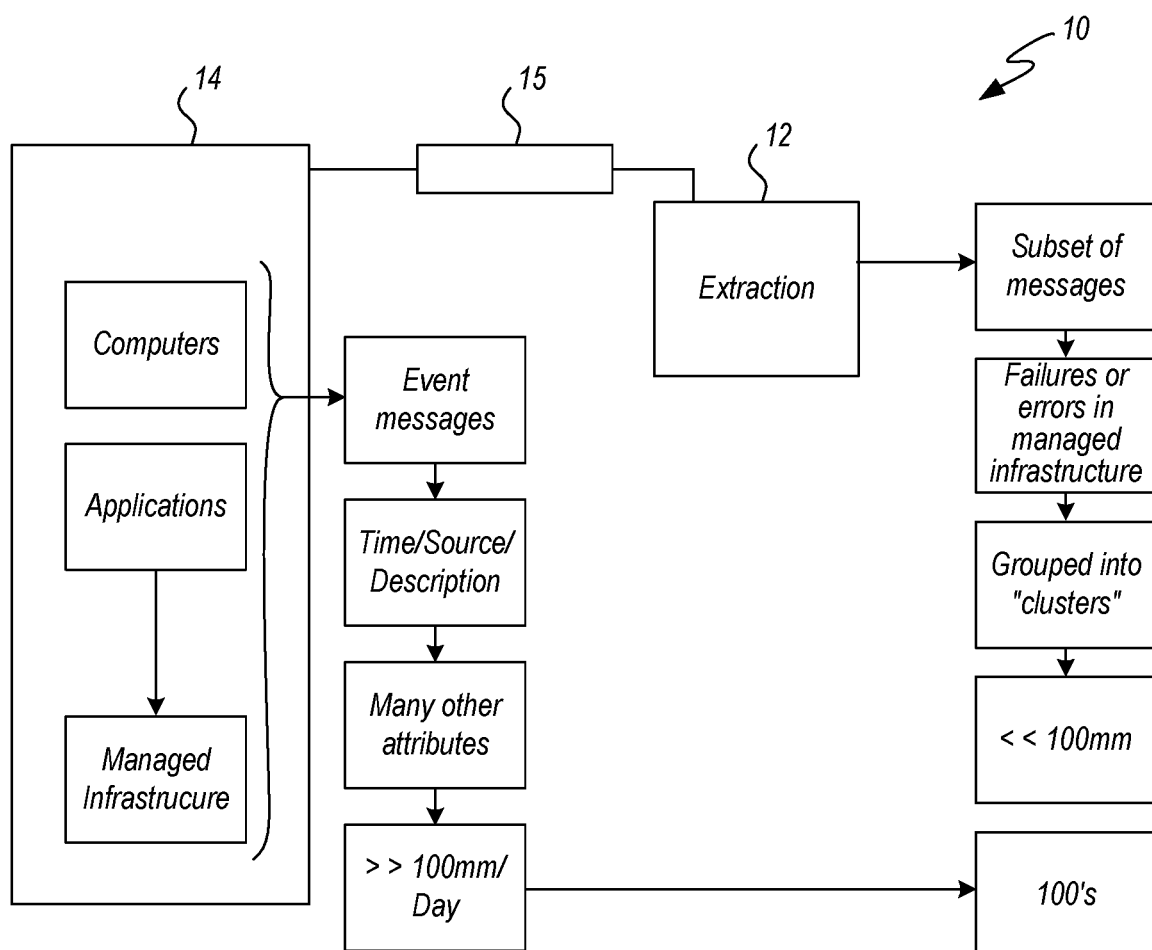
FIG. 1 illustrates one embodiment of an event clustering system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "managed infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein, "event message" or "event" is defined as a change in state. An event is anything that happens, or is contemplated as happening in message form or event form relating to managed infrastructure. An event can include a time stamp, and a name for the entity changing state.

Referring to FIG. 1, an event clustering system 10 (hereafter "system 10") is provided for clustering events received from a managed infrastructure 14.

In one embodiment system 10 includes an extraction engine 12 in communication with a managed infrastructure 12. Extraction engine 12 in operation receives messages from the managed infrastructure 14, produces events that relate to the managed infrastructure 14 and converts the events into words and subsets used to group the events into clusters that relate to failures or errors in the managed infrastructure 14. The managed infrastructure 14 includes physical hardware and supports the flow and processing of information.

As a non-limiting example, managed infrastructure system 14 hardware includes but is not limited to: computers, network devices, appliances, mobile devices, applications, connections of any of the preceding, text or numerical values from which those text or numerical values indicate a state of any hardware or software component of the managed infrastructure 14, and the like.

Managed infrastructure 14 generates data that includes attributes. As a non-limiting example, the data is selected from at least one of, time, source a description of the event, textural or numerical values indicating a state of the managed infrastructure 14.

In one embodiment system 10 makes physical changes in the managed infrastructure including but not limited to: managed infrastructure hardware changes that create physical and virtual links between the managed infrastructure and system 10 server, as well as change to links from the server to system 10 high speed storage.

Figure 2:
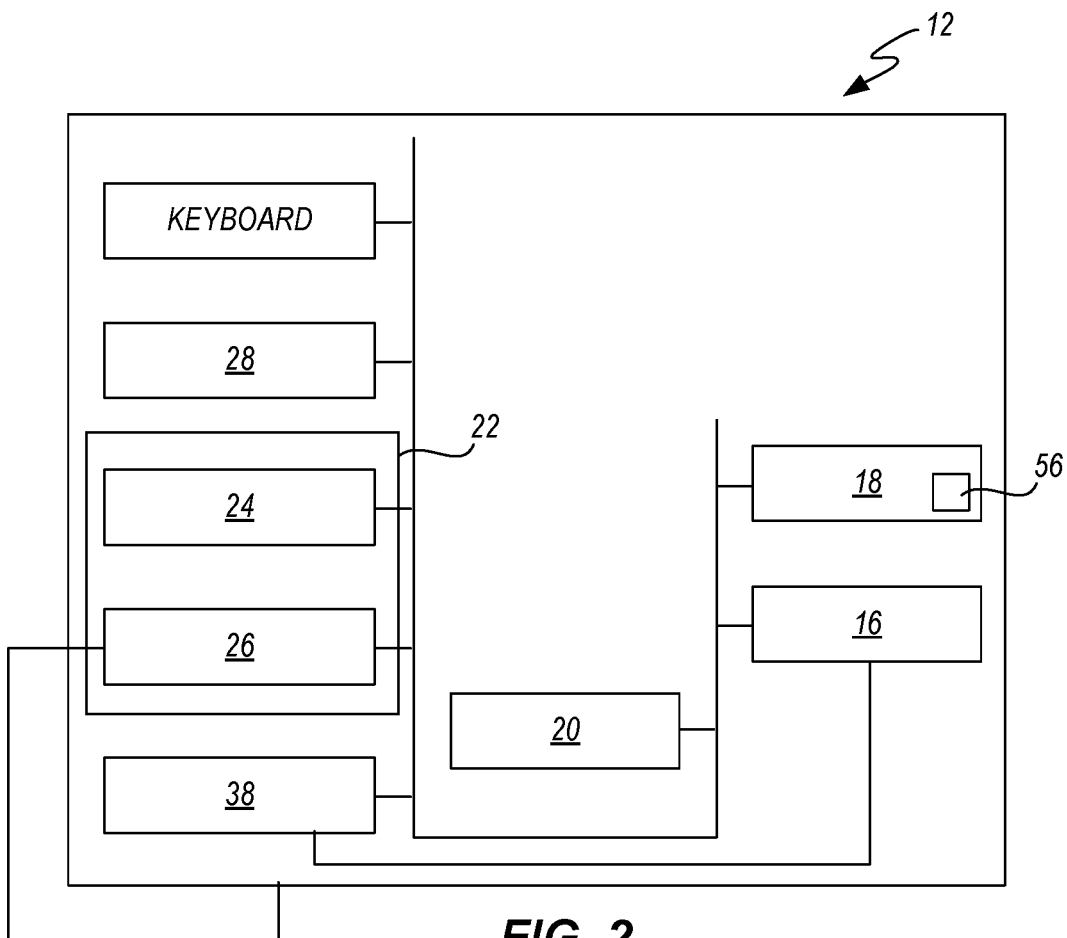
FIG. 2 illustrates a token counter, text extraction and implementation of Shannon entropy in one embodiment of the present invention.

In one embodiment extraction engine 12 communicates with managed infrastructure 14 across an IP network 15 at high speed and with low latency. As a non-limiting example high speed connection is in the gigabits and low latency is in the microseconds. As a non-limiting example high speed is at least 1 gigabit, and low latency is at least 10 microseconds In one embodiment, illustrated in FIG. 2, extraction engine 12 includes a central processor 16, a main memory 18, an input/output controller 20, an interface 22 that can be include an optional keyboard, a display 24, and a storage device 26. Storage device 26 can communicate through a system bus 28 or similar architecture.

Figure 3:
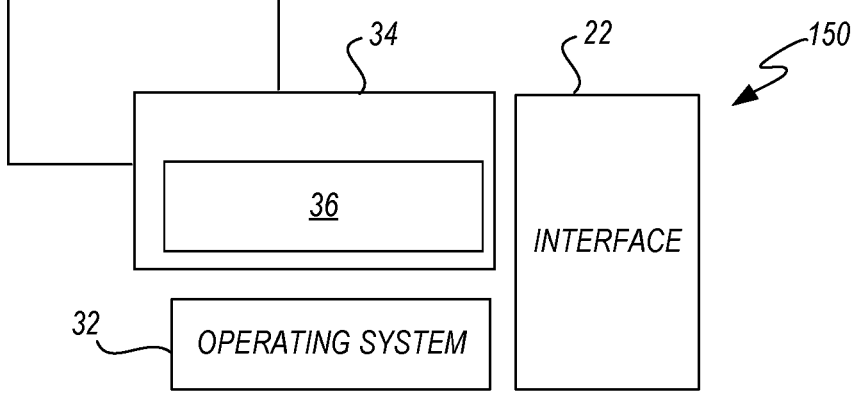
FIG. 3 illustrates one embodiment of a dashboards that can be accessed by users of the event clustering system.

Referring to Figure 3 in one embodiment a software system 30 directs the operation of the extraction engine 12. Software system 30, which can be stored in memory 18, can include an operating system 32 and a shell or interface 34. A user can interact with the software system 30 via interface 22.

Application software 36 can be transferred from storage device 26 which can be via software system 30 into memory 18 for execution by extraction engine 12.

In one embodiment extraction engine 12 receives user commands and data through interface 22. These inputs can be acted on by extraction engine 12 with instructions from operating system 32 and/or application system 34. In one embodiment operating system 32 and/or application system 34 are included in operating software system 30.

The extraction engine 12 breaks event messages 40 into subsets of messages that relate to failures or errors in managed infrastructure 14. In one embodiment the extraction engine 12 breaks events 40 into subsets of messages relative to failure or errors in an managed infrastructure 14 via a message input mechanism, including but not limited to, an input/output controller 20, with or without operating system 32 and/or application system 34, that parses machine elements 38 from managed infrastructure 14 in memory 18. As a non-limiting example machine elements are machine messages.

This can be achieved using operating system 32 and/or application system 34 as well as application software from storage device 26.

Figure 4:
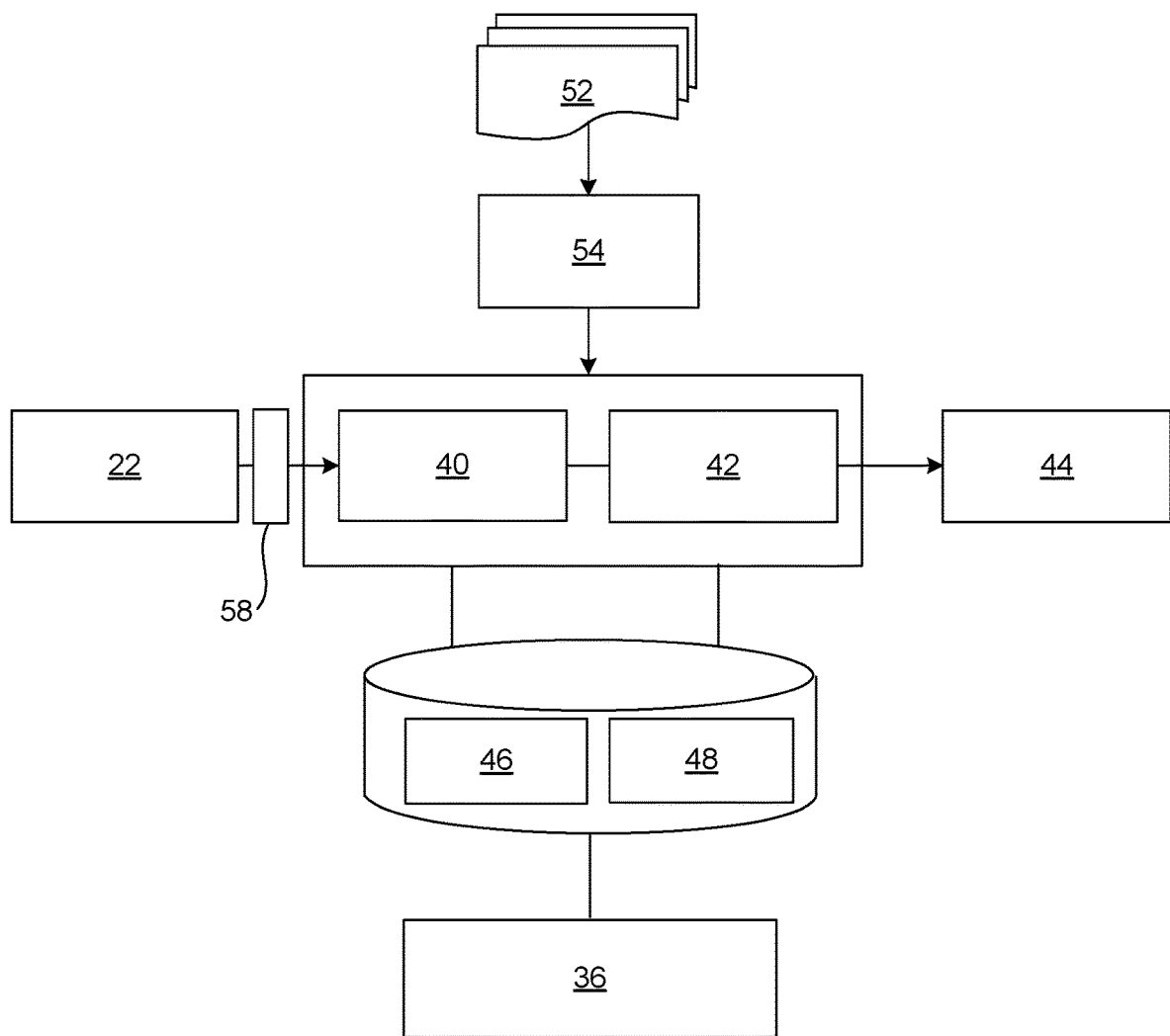
FIG. 4 illustrates processing of alerts, and a matrix M, in one embodiment of the present invention.
Figure 5:
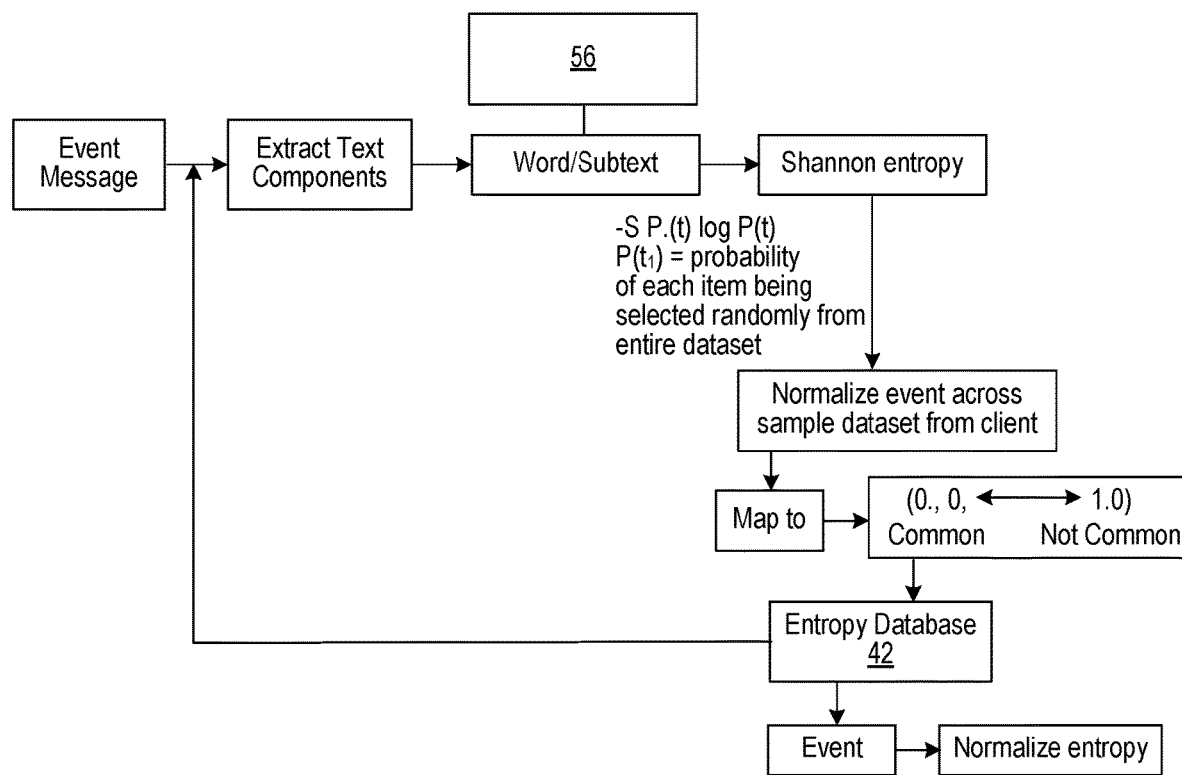
FIG. 5 illustrates an embodiment of a signalizer engine and the creation of alerts where member of cluster indicates common factors in one embodiment of the present invention.

In one embodiment the extraction engine 12 receives managed infrastructure data and produces events 40 as well as populates an entropy database 42, illustrated in FIG. 4, with a dictionary of event entropy that can be included in entropy database 42. This can be achieved with a token counter 58 as illustrated in FIG. 5.

In one embodiment, entropy database 42 is generated with the word and subtexts. As a non-limiting example the entropy database 42 is generated using Shannon Entropy, $-\ln(1/NGen)$ and normalizes the words and subtexts as follows:

$$-\Sigma P(t)\log P(t)$$

where, P(t=probability of each item is selected randomly from an entire dataset.

In one embodiment entropy database 42 normalizes events across data, datasets, from the managed infrastructure 14. As a non-limiting example, normalized entropy for events is mapped from a common, 0.0 and a non-common, 1.0, as discussed hereafter. Entropy is assigned to the alerts. The entropy for each event is retrieved from an entropy dictionary, as it enters the system 10. This can be done continuously in parallel with other operation of the extraction engine 12 or run non-continuously.

In one embodiment entropy database 42 is generated with the word and subtexts. A network includes a plurality of nodes, which as a non-limiting example can be nodes 1-6. A non-directed graph is used to calculate graph entropy for each node in the graph.

The non-directed graph calculates graph entropy for each node in the graph as follows: (i) the source data is used to calculate the graph data; (ii) the non-directed graph is used to calculate the number of links and the clustering coefficient of the node; (iii) the number of links and clustering coefficient of the node together with the total number of links in the graph is then used to calculate an entropy value for each node.

In one embodiment, entropy normalizes events 40 across data, datasets, from the managed infrastructure 14. As a non-limiting example, normalized entropy for events 40 is mapped from a common, 0.0 and a non-common, 1.0, as discussed hereafter. Entropy is assigned to the alerts 20. The entropy for each event is retrieved from entropy database 42 as it enters the system 10. This can be done continuously in parallel with other operation of the extraction engine 12 or run non-continuously.

An N event value is attached to every event of the entropy graph of the source node. Entropy values are used as a cutoff to ignore events 40 from unimportant nodes to classify events 40.

As a non-limiting example the entropy database 42 is generated using Shannon Entropy, $-\ln(1/NGen)$ and normalizes the words and subtexts as follows:

$$-\Sigma P \cdot (t) \log P(t)$$

where, $P(t,)$=probability of each item is selected randomly from an entire dataset.

In one embodiment graph entropy is used as a classification mechanism for elements for a network.

As recited above, system 10 is provided for clustering events 40 received from managed infrastructure 14. In this embodiment graph entropy is utilized for event clustering.

The graph entropy functions of the paths can be rewritten as the following equation:

$$H(G) = \Sigma m, n = 1 \cdot \text{quadrature} \cdot U \cdot \text{quadrature} \cdot P(um\ un\ \ldots\ ) \log(1/P(um\ un\ \ldots\ )),$$
$$m \cdot \text{notequal to } n$$

where $P(u_m u_n)$ can be rewritten as the following equation by combining the aforementioned equation $$P(u_m u_n) = A(u_m) y(u_m, u_n) A(u_n)$$

As a non-limiting example an inference is created from a distribution of the clustering events 40 received from managed infrastructure 14 relative to the nodes, and using graph, with the distribution entropy measured.

As a non-limiting example the entropy of the frequency distribution of connections of the nodes can be used.

As a non-limiting example the events 40 less significant can be can be $-\log(p)$, and with a low probability represented as $(p\sim 0)$ and more significant events 40 are classified as very probable $(p\sim 1)$.

The average is the sum over all nodes i of $$-p\_i * \log(p\_i)$$

or:

$$\text{average}(-\log(p\_i))$$

where p_i is the number of connections of the i-th node divided by the total number of connections. The entropy is the uncertainty of the nodes relative to the clustering events 40 received from managed infrastructure 14.

As a non-limiting example this can be achieved by using an IP protocol stack 46 that communicates with managed infrastructure network protocols 48. The managed infrastructure network protocols 48 can be in communication with application software 36. In one embodiment IP protocol stack 46 can be executed using one or more of In one embodiment embedded agents 50 in hardware components 52, which can be included in extraction engine 12, gather attributes 54 to a managed infrastructure 14 system health to generate data that includes attributes 54. As non-limiting examples hardware components 52 include but are not limited to: computing devices, network switches and devices, storage devices, environmental sensors, power sensors and the like. In one embodiment hardware components 52 can be included in operating system 32 and/or application system 34 and the like.

In one embodiment interface 22, which can include display 24, serves to display results and the user can supply additional inputs or terminate a given session.

In one embodiment operating system 32 can switch between a manual mode and an automatic mode based on constant monitoring. In one embodiment application system 34 can include instructions such as the operations described herein, including but not limited to extracting text components from event 40 messages and convert them into words and subtexts.

In one embodiment operating system 32 and/or application system 34 then reformats data from the event 40 messages to create reformatted data. In one embodiment, the reformatted data is received at bus 28.

In one embodiment extraction engine 12 has a library 56 stored in memory 22.

As a non-limiting example library 56, which can be part of database 42, recognizes sub-categories of messages. As a non-limiting example this is used to reformat data from the event 40 messages to create reformatted data.

The subsets and/or sub-categories of messages can be grouped into clusters. In one embodiment the grouping into clusters is achieved using operating system 32 and/or application system 34.

Figure 6:
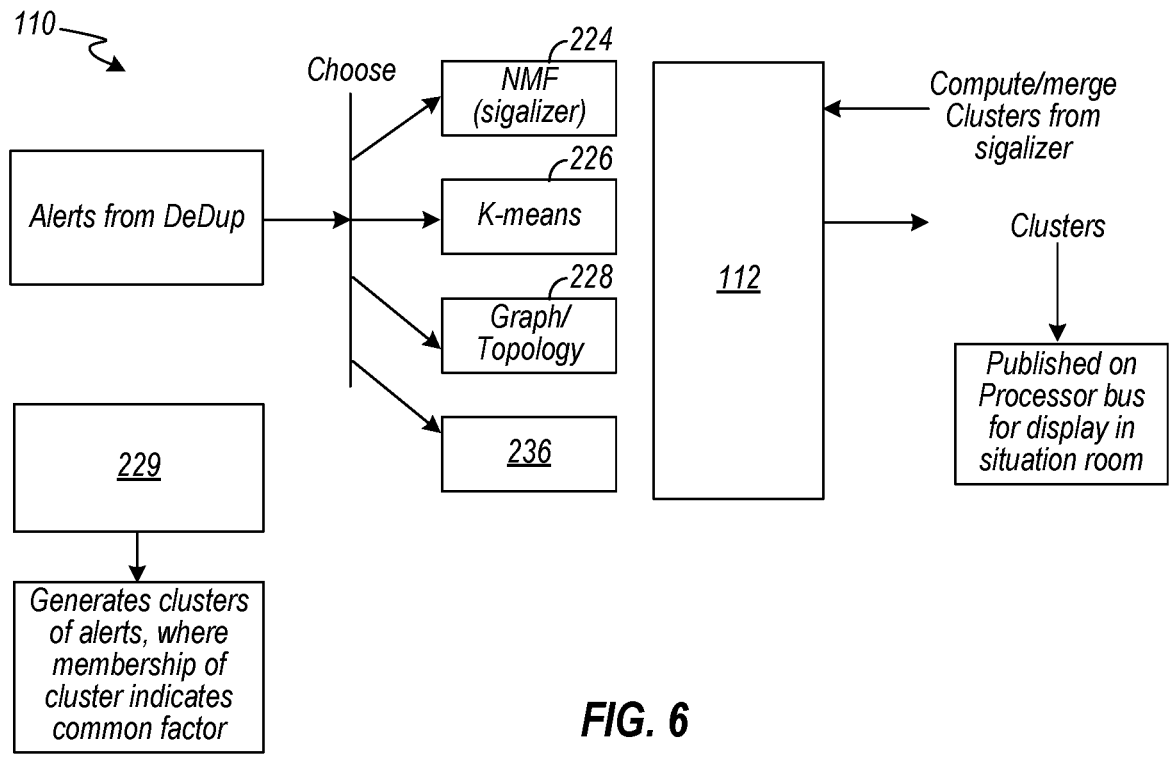
FIG. 6 illustrates k-mean decomposition, a created graph with graph coordinates in one embodiment of the present invention.

Referring to FIG. 6 one or more signalizer engines 110 (hereafter "signalizer engine 110") can include one or more of an NMF engines 224, a k-means clustering engine 226 and a topology proximity engine 228. The signalizer engine 110 determines one or more common steps from events 40 and produces clusters relating to events 40. Each signalizer engine 110 includes a processor and an arithmetic logic unit "ALU". Examples of suitable ALUs are found in EP 0171190 and EP 0271255, fully incorporated herein by reference. In one embodiment, signalizer engine 110 determines one or more steps from events 40 and produces clusters relating to the alerts and or events 40.

The signalizer engine 110 determines one or more common characteristics of events 40 and produces clusters of events 40 relating to failure or errors in the managed infrastructure 14. Membership in a cluster indicates a common factor of the events 40 that is a failure or an actionable problem in the physical hardware managed infrastructure 14 directed to supporting the flow and processing of information.

The topology proximity engine 228 uses a source address for each event 40 and a graph topology of the managed infrastructure 14 that represents node to node connectivity, of the topology proximity engine 228, to assign a graph coordinate to the event with an optional subset of attributes being extracted for each event and turned into a vector. The topology engine 228 inputs a list of devices and a list a connections between components or nodes in the managed infrastructure.

The k-means clustering engine 226 uses the graph coordinates and optionally can use a subset of attributes assigned to each event to generate a cluster in order to bring together events 40 whose characteristics are similar. NMF engine 224 factors a matrix M into A and B, where A is inspected and substantially significant clusters are extracted, and B is used to assign a start and end times for each cluster. An output of clusters is produced. In response to production of the clusters one or more physical changes in one or more managed infrastructure hardware elements is made.

It will be appreciated that signalizer engine 110, NMF engine 224, k-means clustering engine 226 and topology proximity engine 228 can have all or some of the elements similar to those of extraction engine 12 including but not limited to: a central processor, a main memory, an input/output controller, an interface that can be an optional keyboard, a display, a storage device, computer software system, directing operation of relevant engine 224, 226 and 228, a software system, operating system, software transferred from a storage device into memory for execution the associated engine 224, 226 and 228, an input/output controller with or without an operating system, application system, and the like. In one embodiment subsets of messages are grouped into clusters by using a signalizer engine 110, FIG. 6, that has an array of engine components similar or the same as those in extraction engine 12, including but not limited to, computing devices, network switches and devices, storage devices, environmental sensors, power sensors and the like, across a network volatile memory to analyze and create alerts.

In one embodiment a computer software system directs the operation of the signalizer engine 110. Software system, which can be stored in memory, a disk memory and the like, can include an operating system, a shell or interface and an application system.

A user can interact with software system with via the interface. Application software can be transferred from storage device into memory for execution by signalizer engine.

In one embodiment signalizer engine 110 receives user commands and data through an interface. These inputs can be acted by signalizer engine 110 with instructions from operating system and/or application system. In one embodiment operating system and/or application system 1 are included in operating system.

In one embodiment signalizer engine with the array of engine components similar to those of extraction engine 12, groups subsets of messages into clusters.

In one embodiment signalizer engine 110 includes an array of engine components 112 that perform the grouping of message subsets into clusters. In one embodiment the engine components can include the operating system, application system and the like. In one embodiment engine components 112 include but are not limited to: computing devices, network switches and devices, storage devices, environmental sensors, power sensors and the like.

In one embodiment signalizer engine 110 includes a plurality of engines as illustrated in FIG. 6. As non-limiting examples, an NMF engine 224, a k-means clustering engine 226 and a topology proximity engine 228 are provided. Each signalizer engine 110 includes a processor and an arithmetic logic unit "ALU". Examples of suitable ALUs are found in EP 0171190 and EP 0271255, fully incorporated herein by reference. In one embodiment, signalizer engine 110 determines one or more steps from events 40 and produces clusters relating to the alerts and or events 40.

Signalizer engine 110 determines signalizer common steps to ascertain how many clusters to extract from events 40. Membership in a cluster indicates a common factor, which can be a failure or an actionable problem in the managed infrastructure 14. In one embodiment signalizer engine 110 generates clusters of alerts. In one embodiment, an independent failure count detection engine 229 is used for the production of common steps designated as "k" from events 40. The independent failure count detection engine 229 can use SVD decomposition. The SVD decomposition is a continuation of a determination of signalizer 110 common steps.

K is the number obtained from the common signalizer steps. As a non-limiting example, common signalizer steps are designated as Mij, where i are unique events 40 and are the rows of M, j represents the time buckets in M. A value for Mij equals the number of occurrences of event i in time bucket j. This is the common input to the signalizer engines 110.

Figure 9:
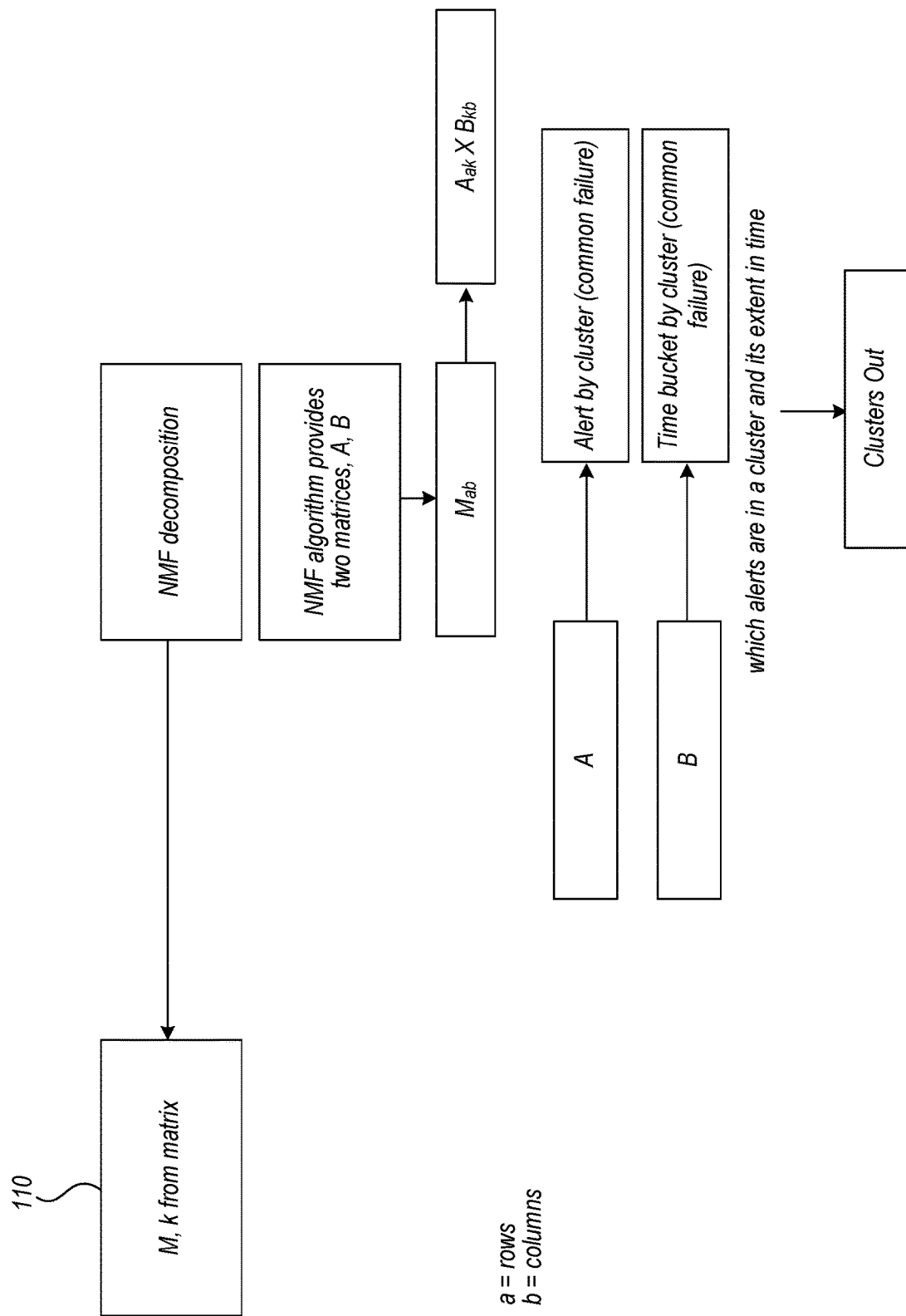
FIG. 9 illustrates the interaction of link access modules with a message bus, algorithm engines, cluster creation and a situation room in one embodiment of the present invention.

In one embodiment topology proximity engine 228 creates a graph coordinate system, FIG. 9. In one embodiment topology proximity engine 228 uses a source address for each event to assign a graph coordinate 230 of a graph 232, with nodes, to the event with an optional subset of attributes being extracted for each event and turned into a vector. The topology proximity engine 228 executes a graph topology and proximity algorithm.

Figure 7:
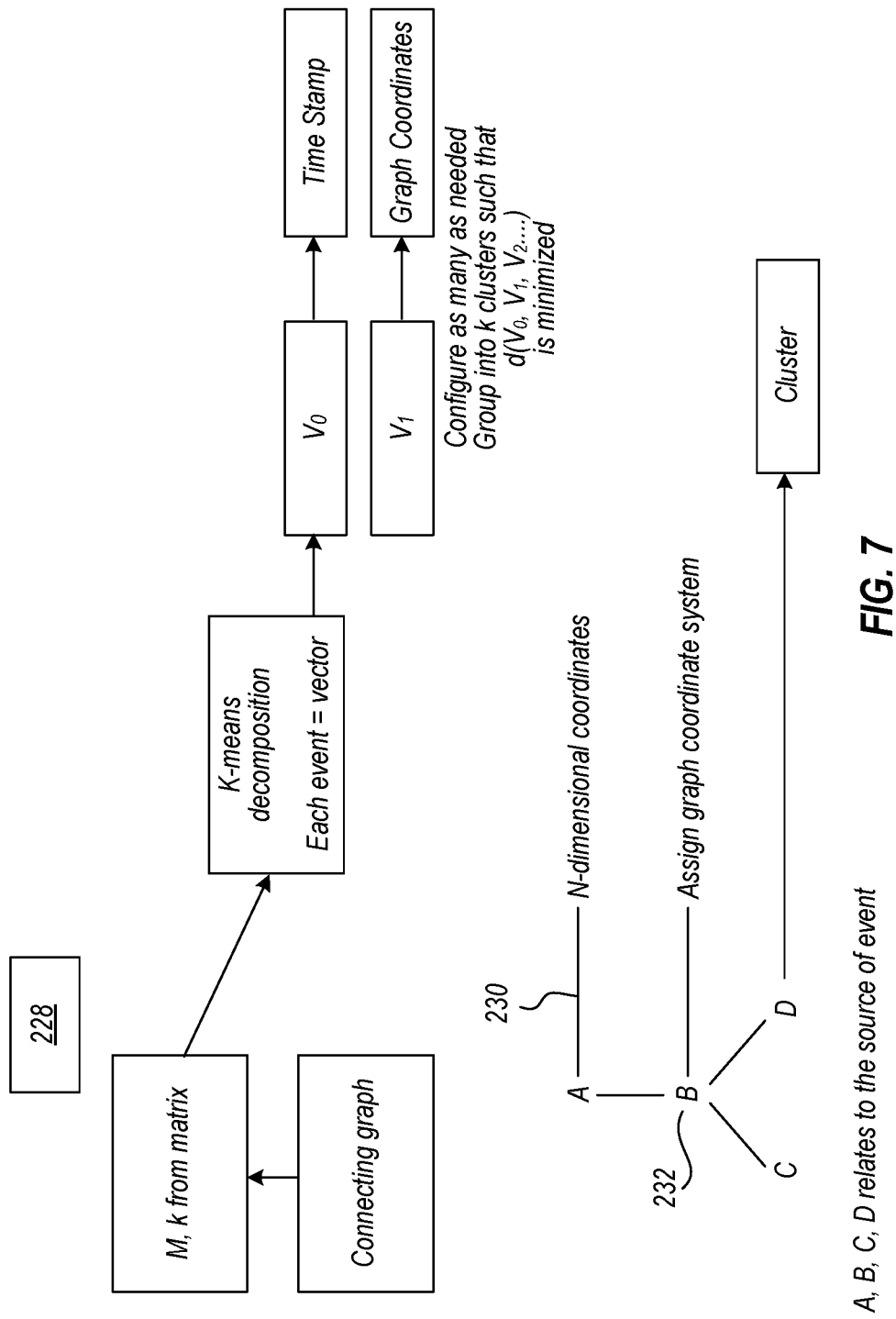
FIG. 7 illustrates one embodiment of alert mapping and vector generation in one embodiment of the present invention.

Mik undergoes K-means decomposition, FIG. 7. Each event is a transformed vector, where (Vo is transformed time stamp. Vi,–Vn and so forth are transformed graph coordinates 234) are grouped into k clusters such that d(Vi, V2,) is minimized. In one embodiment, the topology engine 228 inputs a list of devices and a list of hops, where hop is a connection between components or nodes in the managed infrastructure 14.

As a non-limiting example, the graph 232 can be constructed of any number of points or nodes: A. B, C, and D, which relate to the source of an event. The result is a connecting graph 232, FIG. 7.

The topology proximity engine 228 receives the coordinate's mapping, and clusters are generated. V base nodes calculate a minimum hops to every other node which gives coordinate and the graph coordinates 230 are mapped.

In one embodiment, the k-means clustering engine 226 uses the graph coordinates 230 to cluster the events 40 using a k-means algorithm to determine hop proximity of the source of the event.

M,k is processed by the signalizer engine 110. Mab is transformed to Aak.

Bkb, where a equals rows, and b equals columns, x defines the normal operation of matrix multiplication. M is the matrix as stated above, and k is as recited above.

Figure 8:
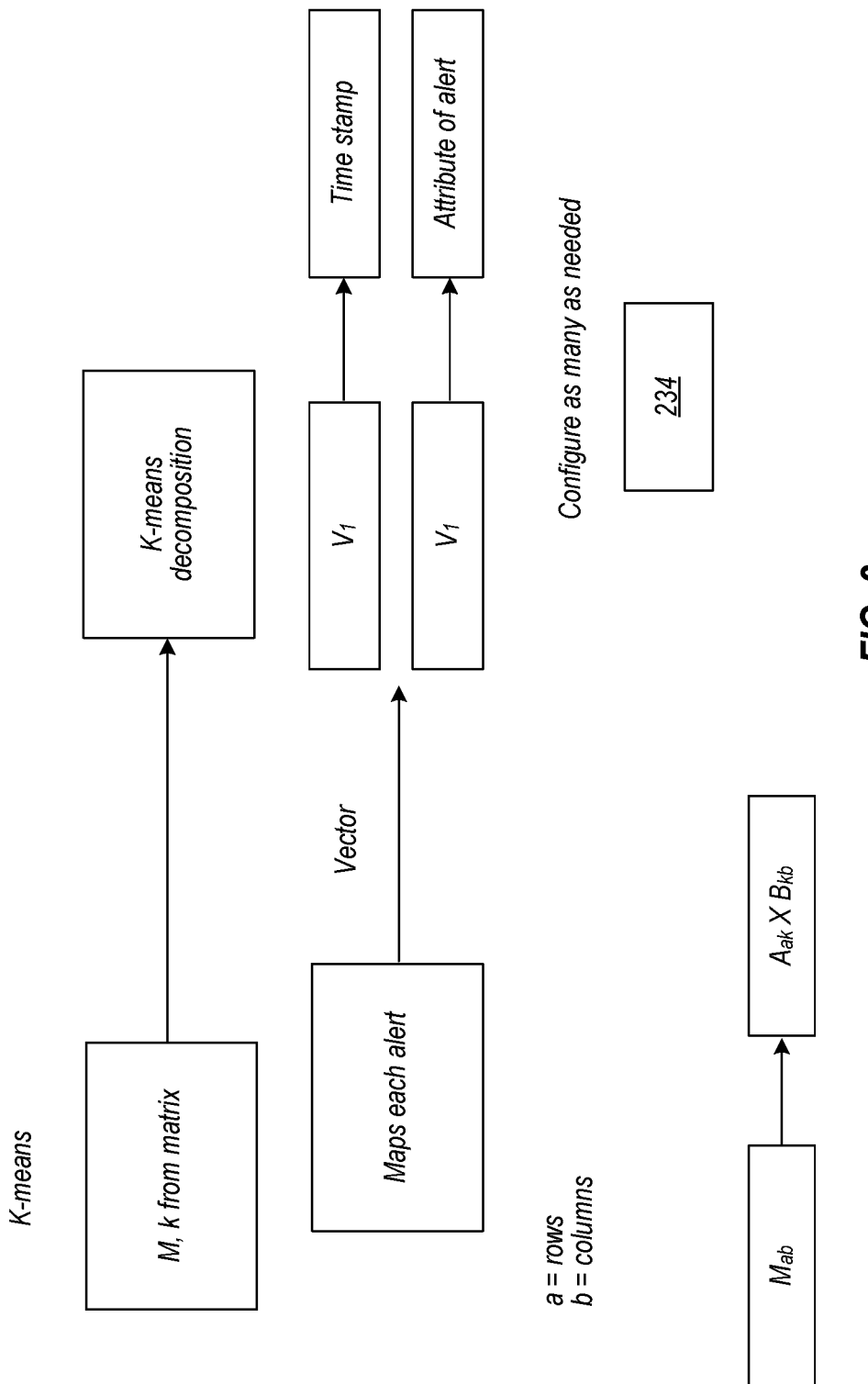
FIG. 8 illustrates NMF decomposition in one embodiment of the present invention.

The NMF algorithm produces two matrices, A and B, FIG. 8. A represents by cluster (a common failure) and B represents time bucket by cluster (a common failure). In one embodiment, the NMF engine 224 factors the matrix M into A and B, where A are deemed to be significant and are extracted, e.g., clusters deemed significant are extracted. The system 10 looks for significantly high values as compared to statistically significant values in the A and B matrix. If they are not statistically significant, they are dropped. The statistically significant elements of M are used to determine a cluster. As a non-liming example, the determination of significance is based on high signatures in the matrix. As above, those that are not high enough are dropped and not included in the output of clusters which is produced.

Each alert is mapped to a vector, VO-Vn, where Vo is a time stamp t; Vi is an attribute of alert. In one embodiment, attributes of an event are mapped to a vector V.

The vectors are grouped into k clusters using k-means such that d(Vi, V2,) is a minimum in its own cluster.

In one embodiment the grouping is executed also using a standard Euclidian distance. In one embodiment, a weighting of components is supplied. System 10 transforms the alert attributes into a number value that is used as the components of the vector. As a non-limiting example, an alert attribute is a textual value. In one embodiment, similar attributes are mapped to numbers that are also similar or close relative to the graph, with the closeness being dynamic and can be predetermined, changed, modified, set, and the like.

In one embodiment of the matrix, M, columns are slices in time and the rows are unique alerts. A unique alert is received from the deduplication engine 23 which eliminates duplications and creates unique alerts.

In one embodiment, the matrix, M is created with alert/time and a fixed number of common alerts. The matrix M can be dynamic and change in time. The matrix M includes rows that can be unique alerts. The matrix includes columns that are time buckets, and a number of occurrences are plotted.

Evaluated events 40 are either discarded or passed to clusters with alerts are collected into time buckets and mapped in the matrix M. In one embodiment, a bucket width is a parameter that can be an input to the signalizer engine 110.

Outputs from the signalizer engines 110 are received at a compare and merge engine 334. The compare and merge engine 334 communicates with one or more user interfaces 22 in the situation room 336, FIG. 10. The three signalizer algorithms are used with the comparison or merger engine 334 and clusters are published on system 10 for display in the situation room 336.

As a non-limiting example, the bus 28 can be a publication message bus. As a non-limiting example, the bus 28 processes anything that goes from A to B, and from B to A. In one embodiment, a data bus web server is coupled to user interfaces.

Figure 10:
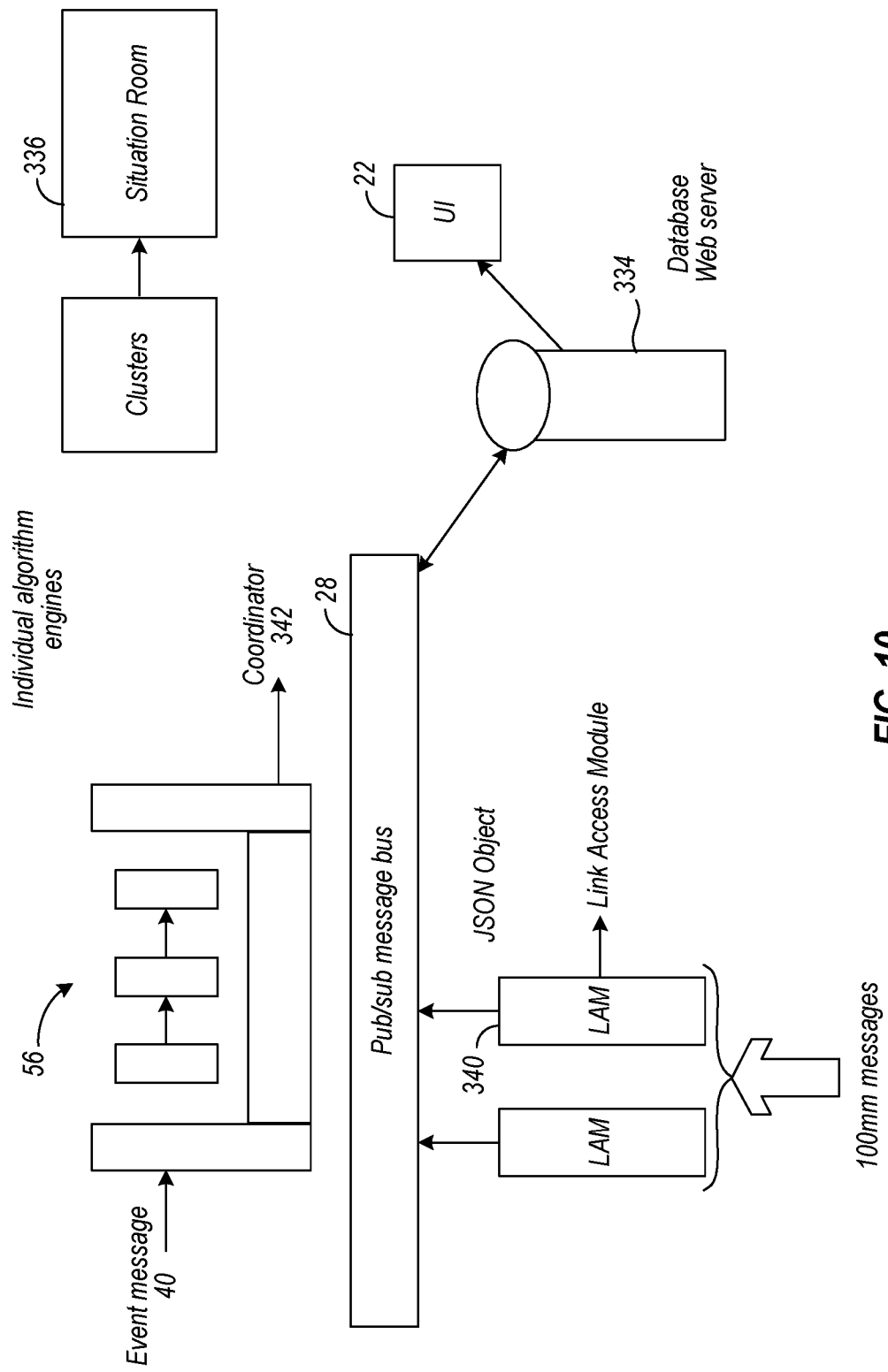
FIG. 10 illustrates one embodiment of a deduplication engine that can be used with the present invention.

As illustrated in FIG. 10, a plurality of link access modules 340 are in communication with the data bus 438 and receive messages/events 40. Events 40 are received by a coordinator 342 that executes clustering of the events 40.

In one embodiment, normalized words and subtexts are mapped to a common, 0.0 and a non-common, 1.0, as illustrated in FIG. 5.

The alerts can be run in parallel with the activities of the system 10. The alerts are passed to the signalizer engine 110, FIG. 6.

Figure 11:
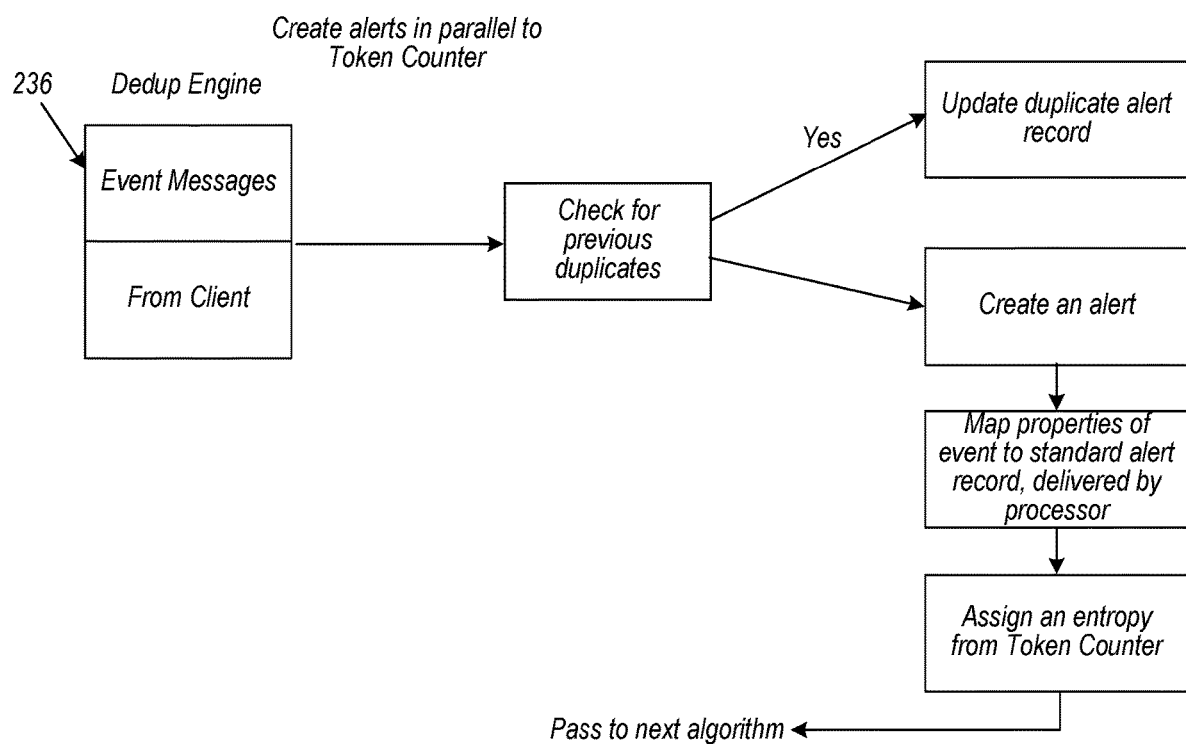
FIG. 11 illustrates one embodiment of actions that can be taken following event clustering generation.

In one embodiment, deduplication engine 236, FIG. 11, is used for event messages of data streams received from the client. The deduplication engine 236 eliminates duplicate copies of repeating data. In one embodiment, the deduplication engine 236 reduces a number of bytes in network data transfers that need to be sent.

A computer scripting language script language can be included that alters the events 40 or flow of events 40. As non-limiting examples, the scripting language can be, Java, C, C++, C#, Objective-C, PHP, VB, Python. Pearl. Ruby, Javascript and the like.

In one embodiment, the NMF, k-means, and/or topology proximity algorithms are optionally repeated. The repeating can be performed by varying k from the previously performed common steps in the signalizer engine 120, and optionally along with the SVD decomposition.

Optionally, generated clusters are tested against a quality function supplied by the system 10 which evaluates a cluster's uniformity. In one embodiment, the system 10 selects a best set clusters against the quality clusters.

As a non-limiting example, clusters are examiner against a customer supplied configuration database for each source of an event. As a non-limiting example, the examining can be performed to determine: a type of device; impacted users: relevant support experts, and the like, FIG. 12.

Example 1

As a non-limiting example, the NMF algorithm can be executed as follows:

Let Mij be an x p non-negative matrix, (i.e., with M>0, and k>0 an integer). Non-negative Matrix Factorization (NMF) consists in finding an approximation $$X = WH(AB), \quad (1)$$

where W, H are n k and k p non-negative matrices, respectively. In practice, the factorization rank r is often chosen such that r<<min(n, p) but is determined.

$ The main approach to NMF is to estimate matrices W and H as a local minimum: 1) M=AB A, B seed randomly tentatively adjusts A, B until the Frobenius distance ||M−AB|| is minimized where D is a loss function that measures the quality of the approximation. Common loss functions are based on either the Frobenius distance or the Kullback-Leibler divergence.

R is an optional regularization function, defined to enforce desirable properties on matrices W and H, such as smoothness or sparsity.

Example 2

As a non-limiting example, a k-means algorithm is used as follows:

Given a set of event vectors $(x_1, x_2, \ldots, x_n)$, where each observation is a d-dimensional real vector, k-means clustering aims to partition the n observations into k sets (k<n) $S=\{S_1, S_2, \ldots, S_k\}$ so as to minimize the within-cluster sum of squares (WCSS):

$$\operatorname*{argmin}_S \sum_{i=1}^{k} \sum_{x_j \in S_i} \|x_j - \mu_i\|^2$$

where $\mu_i$ is the mean of points in $S_i$.

Figure 13A:
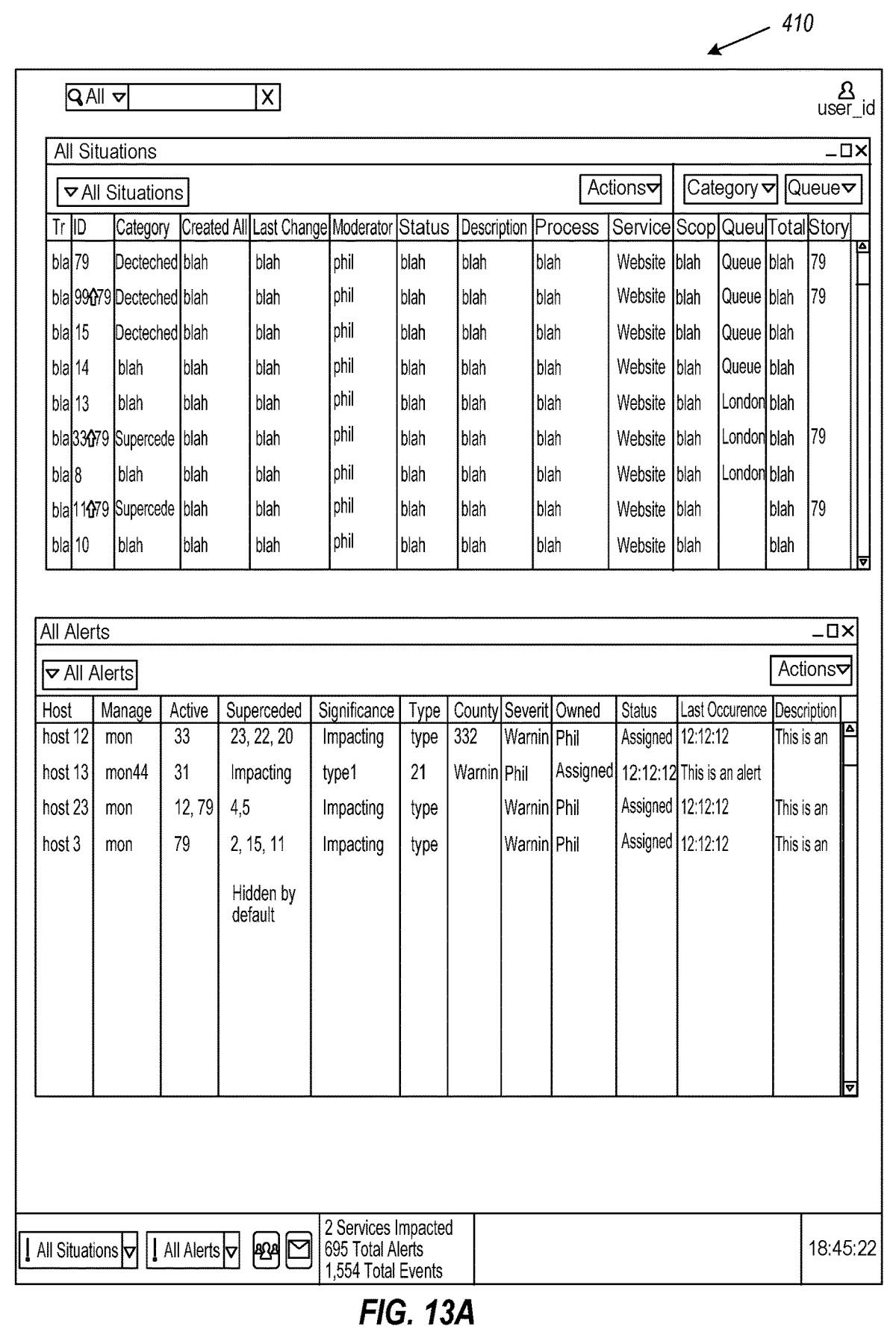
Figure 13B:
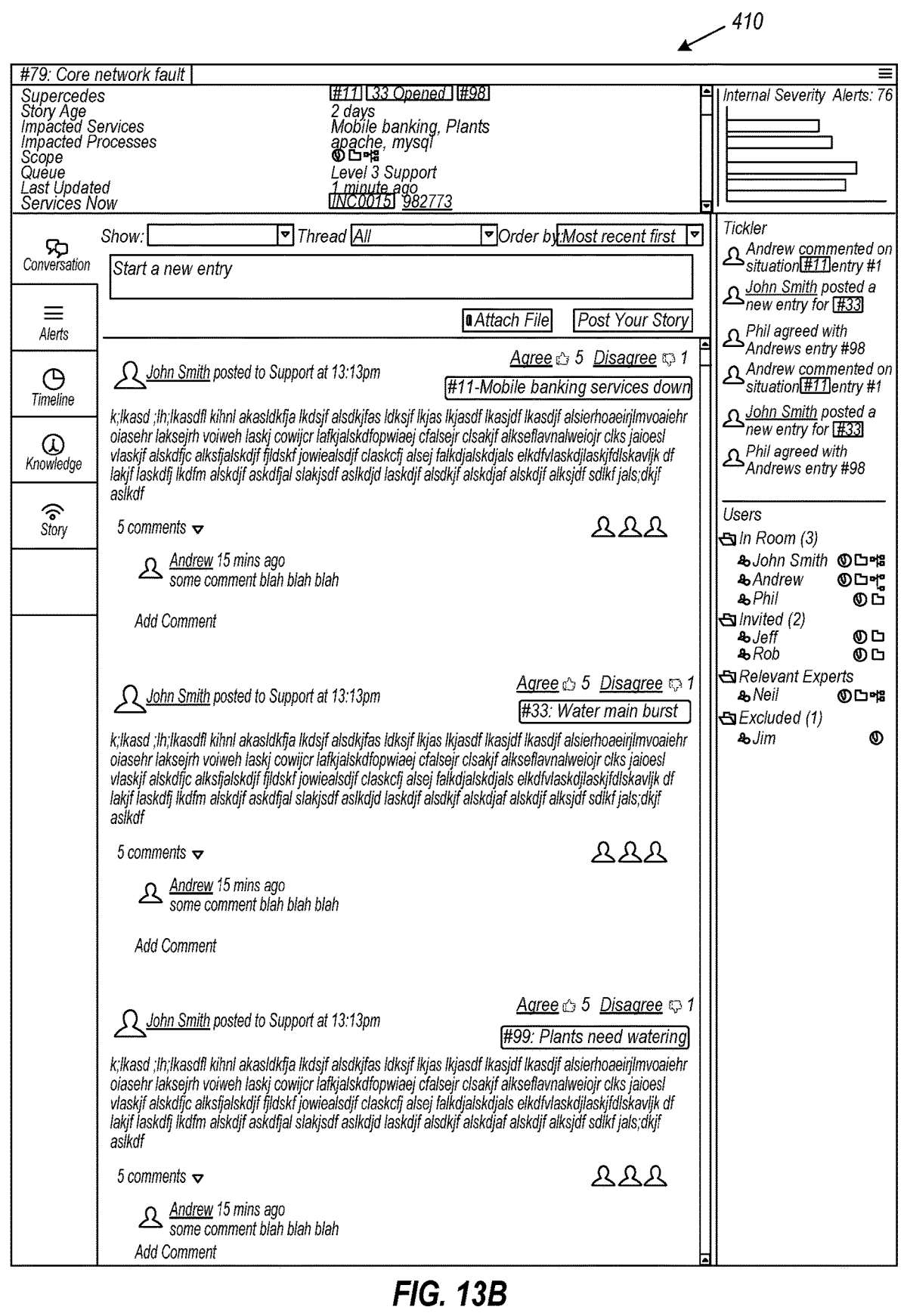

In one embodiment, illustrated in FIGS. 13(a) and 13(b) a dashboard 410, associated with a situational room, is included which allows entities and/or people to manipulate messages/events 40 from managed infrastructure, alerts or events 40.

Figure 14:
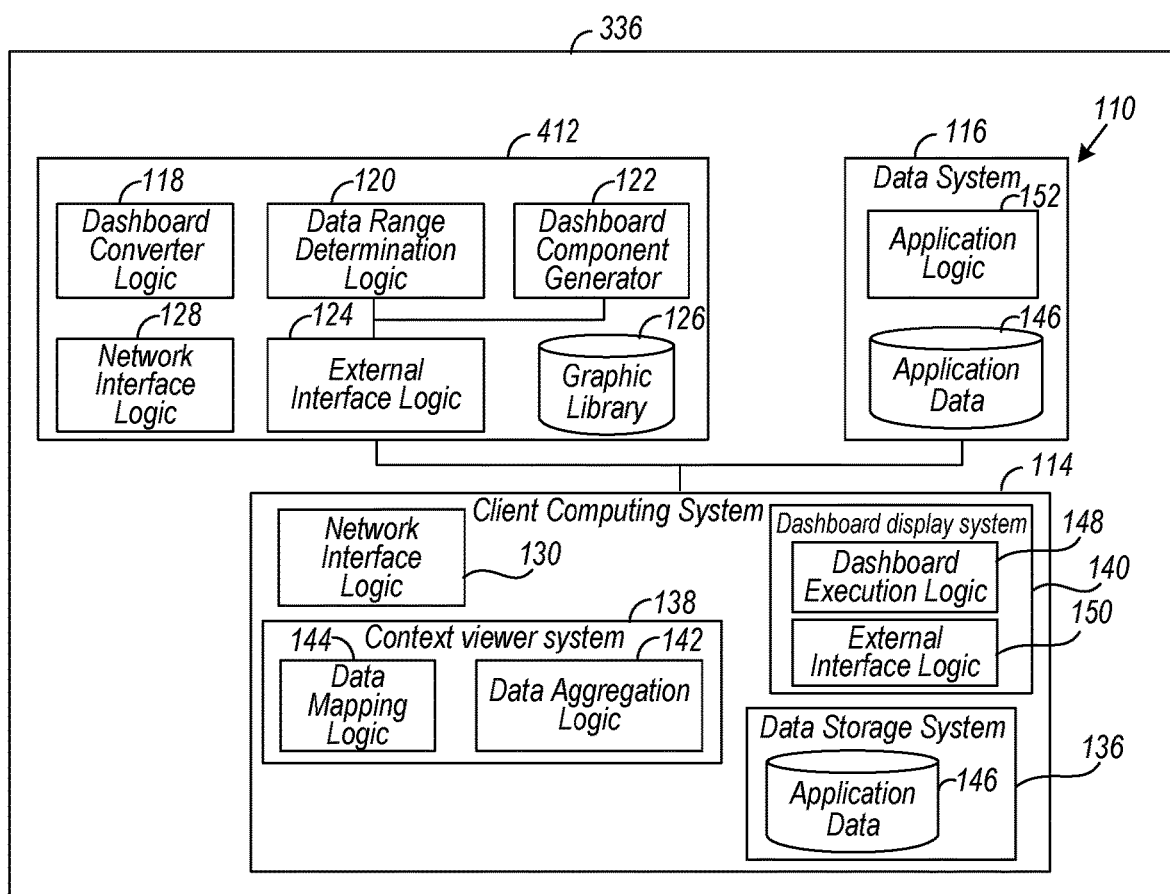
FIG. 14 is an example software architecture diagram that may be implemented using the systems shown in FIG. 1.

As a non-limiting example an alert engine 411 receives the events 40 and creates alerts that are mapped into a matrix "M" of events 40, as illustrated in FIG. 14. As a non-limiting example. Mik is the matrix of events 40.

In one embodiment of the situation room 336, as illustrated in FIG. 1, (a) system 10 is provided for creating, and displaying in a dashboard directed to the system 10 from clustering messages received from the managed infrastructure 14, also known as the dashboard system for the situation room 336.

In one embodiment, illustrated in FIG. 14, situation room 336 has a display that can be interactive. Situation room 336 can be coupled to or includes a dashboard design system 412, display computer system 414, and a data system 416.

In one embodiment, system 10 includes dashboard converter logic 420, data range determination logic 432, dashboard component generator 422, external interface logic 424, graphic library 426, and network interface logic 428. In one embodiment, the system includes data processing computing systems.

In one embodiment, the dashboard file converter logic 419, which as a non-limiting example converts the situations and alerts 40 from system 10 from clustering messages received from the managed infrastructure 14 data structures and data, to be compatible with or match with the interface logic 424.

In one embodiment, the logic 419 provides communication between the graphical dashboard and the problem walls from clustering messages received from the managed infrastructure 14.

The problem walls from clustering messages received from the managed infrastructure 14 are provided as disclosed above.

In one embodiment, the logic 432, dashboard component generator 422 and the external interface logic 424 are each used for designing the problem walls from clustering messages received from the managed infrastructure 14.

A dashboard or SWF file can be included that establishes a data range, type of components and the external interface. In one embodiment, the logic 432 is used for a data range in a spreadsheet associated with the dashboard file used to generate a visual display.

In one embodiment, a dashboard component generator 422 is provided that allows a user to place problem walls from clustering messages received from the managed infrastructure 14 components with various attributes onto a canvas. The canvas can be a space where various visual components are.

In one embodiment, the user is able to choose components directed to problem walls from clustering messages received from managed infrastructure 14 elements from a different components. These can be included in a panel and the user can then place them on the canvas in any way that the user desires.

In one embodiment, the components are provided by the client, by the system, by third parties, and from third parties. Examples of other components include but are not limited to, graphs, style of presentation, additional information, comparisons, trends, artistic elements, text, and the like. In some embodiments, the user, or client can select the background, margins, presentation of elements and the like.

In one embodiment, an external interface logic 424 is provided. The interface logic allows a dashboard to provide data ranges, permutations, trends, activities, and the like associated with problem walls from clustering messages received from the managed infrastructure 14. In one embodiment, interface logic 424 allows the business application software to export application data to be displayed in a dashboard in an interactive visual format.

In various embodiments, a network interface logic 428 and 430 allows for connectivity of the dashboard design system 412, display computer system 414 and data system 416 to each other, or to public networks. In one embodiment, a graphical file that has been configured by the computer system 412 is stored in the data storage system 436. In one embodiment, the graphic file is used for data mapping, both during and after design time, and can generate the display during a period of execution. The external adapter can be utilized for communication between the data storage system 436 and the graphical file.

In one embodiment, network interface logics 428 and 430 allow computer systems 412, 414 and 416 to connect to each other and the other computer systems. As a non-limiting example, the network interface logic 428 and 430 can be one or more computers or web servers that provide a graphical user interface for clients or third parties that access the subsystems of system 412, 414 or 416 through the Network System or a Network System protocol. The network interface logic 428 and 430 can include other logics configured to provide interfaces for other types of devices, including but not limited to mobile devices, server-based computing systems, and the like.

As a non-limiting example, in one embodiment, the display computer system 414 includes, network interface logic 430, context viewer system 438, data storage system 436 and dashboard display system 440.

In another embodiment, the dashboard display system 440 is included in the context viewer system 438, and be executed in a machine, one or more display and other computers, with machine-readable storage media, cache, memory, flash drive or internal or external hard drive or in a cloud computing environment, non-transitory computer readable media or non-transmissible computer-readable media, with stored instructions executed by the machine to perform the operations. In one embodiment, the context viewer system 438 is a program product that performs various processing functions. As non-limiting examples, these functions can include, receiving data from the data source, preparing data by aggregating, providing access to visualization capabilities, and the like.

In one embodiment, the data storage system 436 stores data related to problem walls from clustering messages received from the managed infrastructure 14 applications executed on the display computer system 414.

In one embodiment, the data storage system 436 stores problem walls from clustering messages received from the managed infrastructure 14 data or statistical data. As a non-limiting example, the dashboard display system 440 communicates with the display computer system 414 to display problem walls from clustering messages received from managed infrastructure 14 data in a dashboard in a visual manner or in visual components using graphics. Displaying problem walls from clustering messages received from managed infrastructure 14 data graphically may include displaying bar graphs and/or pie charts or other visual displays. In order to generate the dashboard display, the client can map dashboard data fields to the problem walls from clustering messages received from managed infrastructure 14 data fields. This allows access of data from problem walls from clustering messages received from managed infrastructure 14 without data replication.

Embodiments of the data storage system 436 may store a variety of information including application data in database 430. The application data database 430 may receive data from the data system 416. The data storage system 436 may provide data to the context viewer system 438. More specifically, the data storage system 436 may provide data to the data aggregation logic 442. The data storage system 436 may receive appropriate data mapping instructions from the data mapping logic 444 and query the data system 416 to correlate the data from one mapped field in the dashboard tool to the mapped fields in the application data 446.

Embodiments of the dashboard display system 440 may be provided on the display computer system 414. In an example embodiment, the dashboard display system 440 may transfer data from various data sources or data from various applications to external data ranges of the graphic file and display the graphical interface during runtime operations. The dashboard display system 440 may include all of the features discussed above with regard to the dashboard design system 412. Also, the dashboard display system 440 also includes a dashboard execution logic 448 and external interface logic 450. The external interface logic 450 may have similar features as the external interface logic 424 of the dashboard design system 412. The external interface logic 450 may expose selected data ranges of the dashboard to the business software data. The external interface logic 450 may allow the business application software to export application data to be displayed in the dashboard in a visual format instead of a textual format. During runtime when displaying the dashboard in the business application, the dashboard execution logic 448 is configured to receive the data from the business application and generate a Flash Island interactive display as designed by the dashboard design system 412 or dashboard display system 440.

The data system 416 includes an application logic 452 and application data 446. The data system 416 may be configured to provide data and communicate with the display computer system 414. The application logic 452 is the server side of the application that provides back end information to the context viewer system 438. For example, the application logic 452 may comprise an Enterprise Resource Planning (ERP), Customer Relation Management (CRM) or Business Intelligence (BI) system. Business intelligence may refer to computer-based techniques used to analyze business data, such as sales revenue by products and/or departments or associated costs and incomes. The application data 446 may include relational or other types of databases. The application data 446 includes various fields that may be mapped to the fields exposed by the external dashboard interface.

Figure 13C:
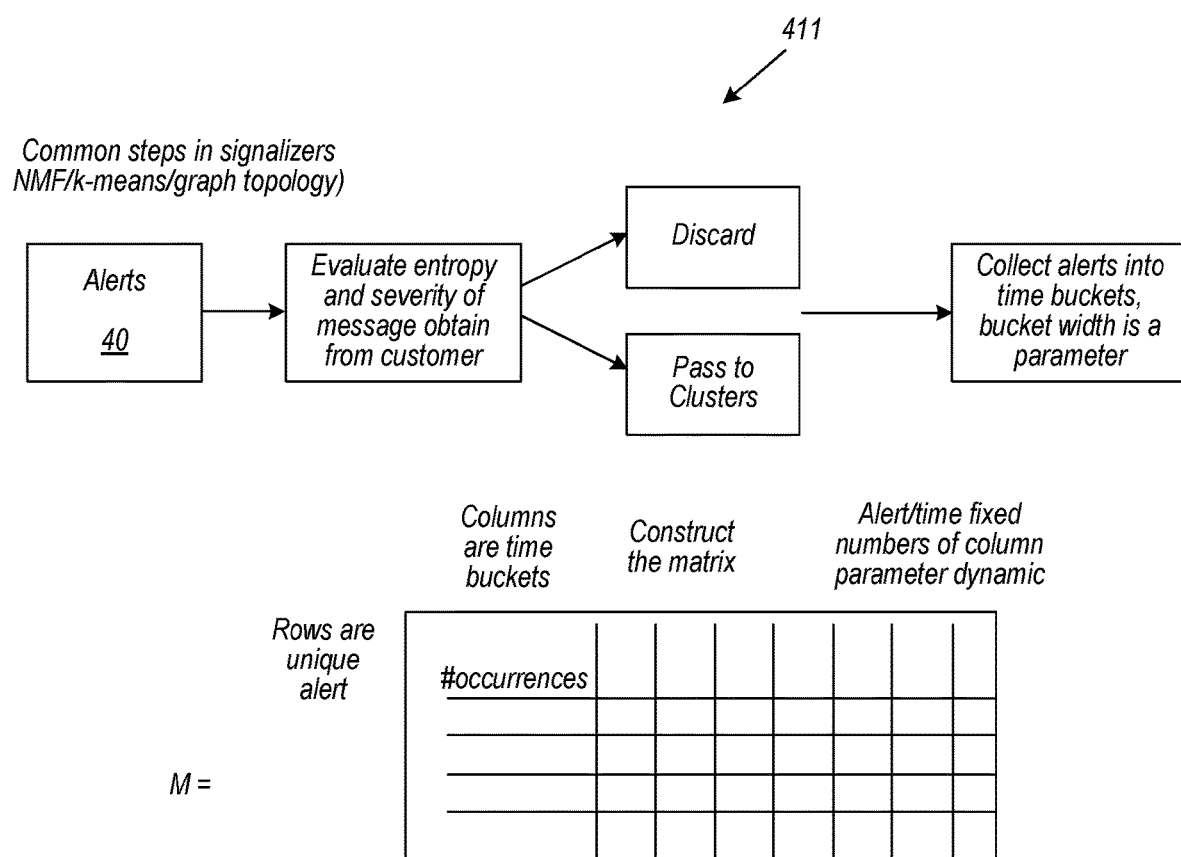
FIG. 13(c) illustrates one embodiment of an alert engine

FIG. 14 is an example process that may be implemented using the system shown in FIG. 13(c). Initially, at step 454, in an example embodiment a dashboard design user may build a dashboard using a dashboard building software. The dashboard design user may configure the dashboard during design time. In an example embodiment, design time may include the design user configuring the dashboard layout and exposing a related data range. The dashboard design system 412 may be used to create a dashboard layout. Building the dashboard includes placing components on the canvas and configuring the properties associated with those components. As discussed above, the components may be among other components, a chart or graph. At step 456, the dashboard design user may determine and specify using a graphical user interface the data ranges for the dashboard. After creating the dashboard, at step 458, the dashboard may be exported automatically or by input from the dashboard design user to a SWF file format. Steps 454, 456 and 458 may be performed by the dashboard design user using the dashboard configuration system 412. This is then communicated to a client community system at steps 460, 462 and 464.

Figure 15:
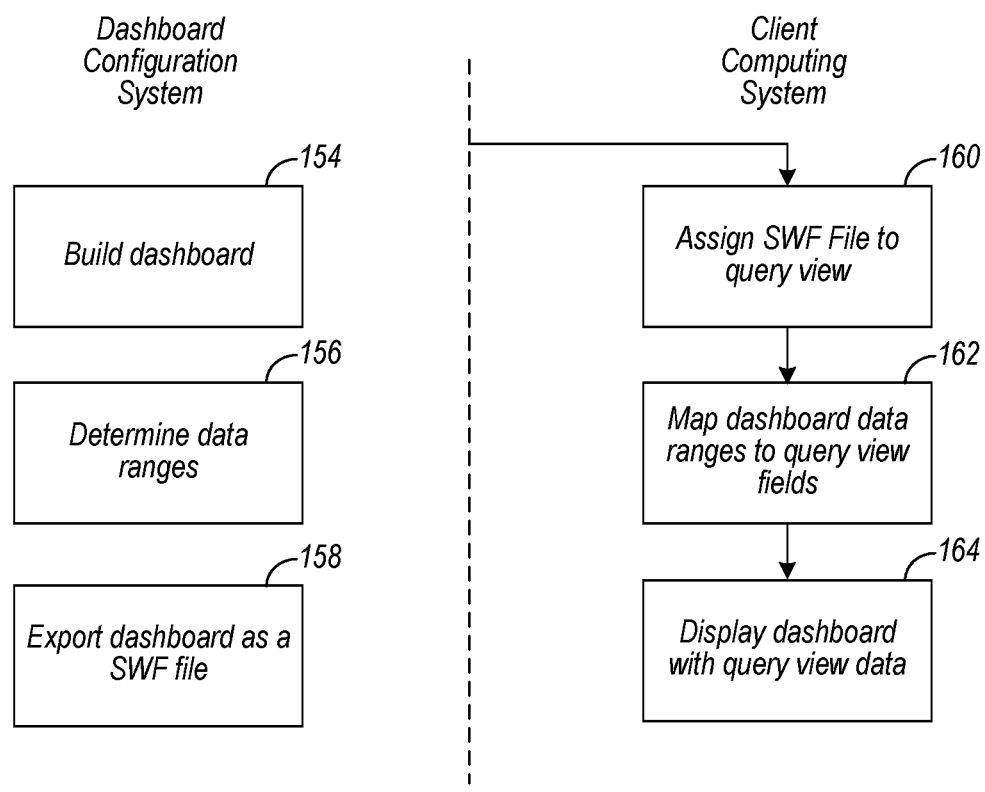
FIG. 15 is a screen display of a dashboard display system that may be used to configure a dashboard.

A business user may perform the other steps of FIG. 15 by using the display computer system 414. In an example embodiment, the business user's steps may be performed during runtime. In this embodiment, runtime includes displaying of the dashboard in a business application using data from business application data sources. In another embodiment, the business user may perform the steps described above with regard to the dashboard design user.

At step 460, the business user may open the context viewer system where the business user may select a chart view 498 as shown in FIG. 16. In the chart view tab, the business user may assign the dashboard or SWF® file to a query view by specifying the location of the file. At step 462, the dashboard data ranges that were determined at step 456 may be mapped to query view fields.

In an example embodiment, the data from the data source 436 (or 416) is placed in the mapped location in the dashboard. In another example embodiment, the mapping between application data and graphical interface data may identify which application data may be shown in the reserved placeholder of the dashboard. After mapping the data ranges, at step 464 the dashboard may be displayed in the business application. In one embodiment the business application may be software applications that provide various functionalities such as, customer relationship management, enterprise resource management, product lifecycle management, supply chain management and supplier relationship management. In another embodiment, the dashboard may be configured to receive data from the data system 416 after the mapping has occurred or the data may be accessed during runtime.

Figure 17:
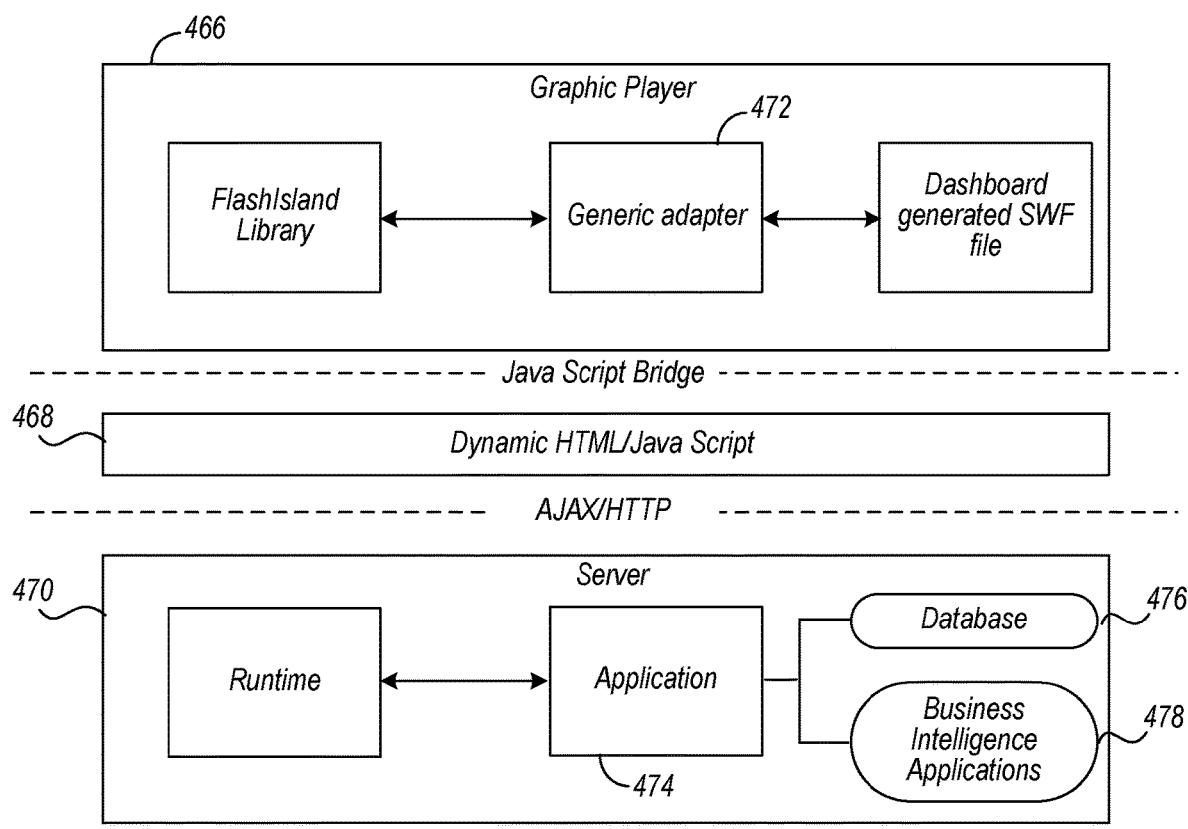
FIG. 17 is a screen display that allows a user to choose a chart view in order to display data in a graphical format.
Figure 18:
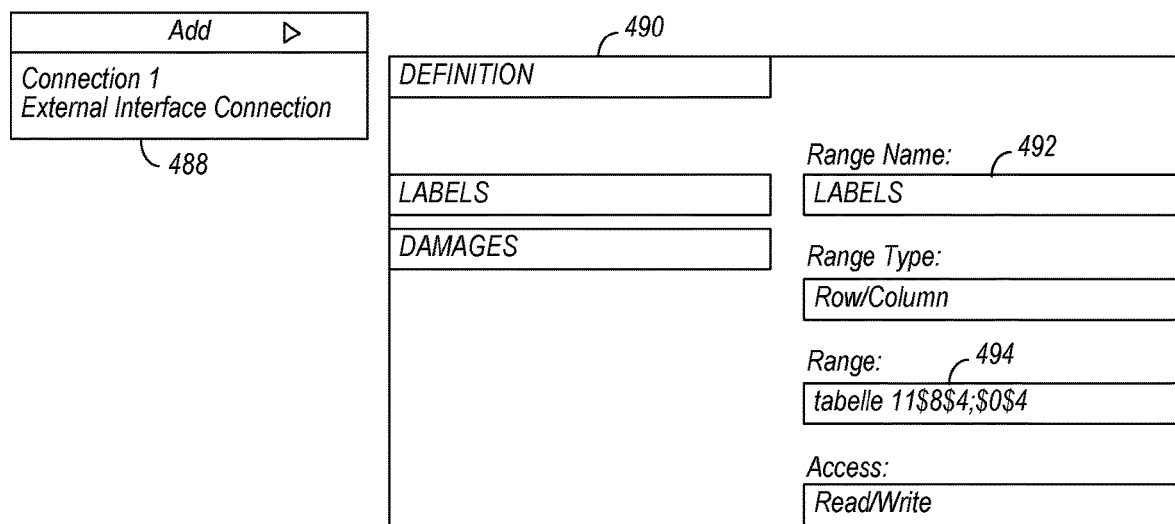
FIG. 18 is an example screen display showing the data mapping feature of the dashboard configuration screen.

FIG. 18 is an example software architecture that may be implemented using the system in FIG. 14. The software architecture diagram shown in FIG. 17 shows various software layers, such as, graphic player 466, component Dynamic HTML or Java® Script 468, and Server (Java® or Java® based or other high level programming language based) 470 layers. In particular, the generic adapter 472 may be built with the Flash Island library, which may facilitate the client-side communication between HTML and JavaScript®. The Dynamic HTML 468 may load the generated dashboard in a graphic file, or Flash/SWF representation. The generic adapter 472 may convert the Java® context into structures that match the dashboard's external interface format or the dashboard format. The generic adapter 472 allows the business user to generate a dashboard in a business analytic software using the most updated data from a data source without writing any customized software. The generic adapter 472 may load dashboard data ranges and convert the associated data into an XML® string that may be used for further conversion into an ABAP® string, which may be used by the business analytic software.

In another embodiment. FIG. 17, the generic adapter 472 may convert the Flash Island properties into dashboard structures. In an example embodiment, the generic adapter 472 may be used to load external dashboard ranges during the configuration stage, at step 462. In this embodiment, the generic adapter 472 may push application data to the data ranges defined in step 462. In another embodiment, the generic adapter 472 may provide an application programming interface between the graphic player 466 and the server 470. The generic adapter 472 may load dashboard ranges automatically and the dashboard data ranges may be converted into XML strings. The XML string may be converted into Java® or ABAP® code which may be executed by the business application 474, to display a dashboard. The server 470 may include NetWeaver®, ABAP® or Java® language programming and the server may include various systems that are supported in the business software suit, the runtime 382, application 474, database 476 and business intelligence application 478. In another embodiment, the functionality of the server 470 may be implemented by the display computing system 414. In yet another embodiment the functionality of server 470 may be divided between the display computing system 414 and data system 416. In another embodiment, the graphic player 466 may be implemented on the dashboard design system 412. Additionally or alternatively, the functionality of the graphic player 466 may be implemented on the display computing system 414.

Figure 12:
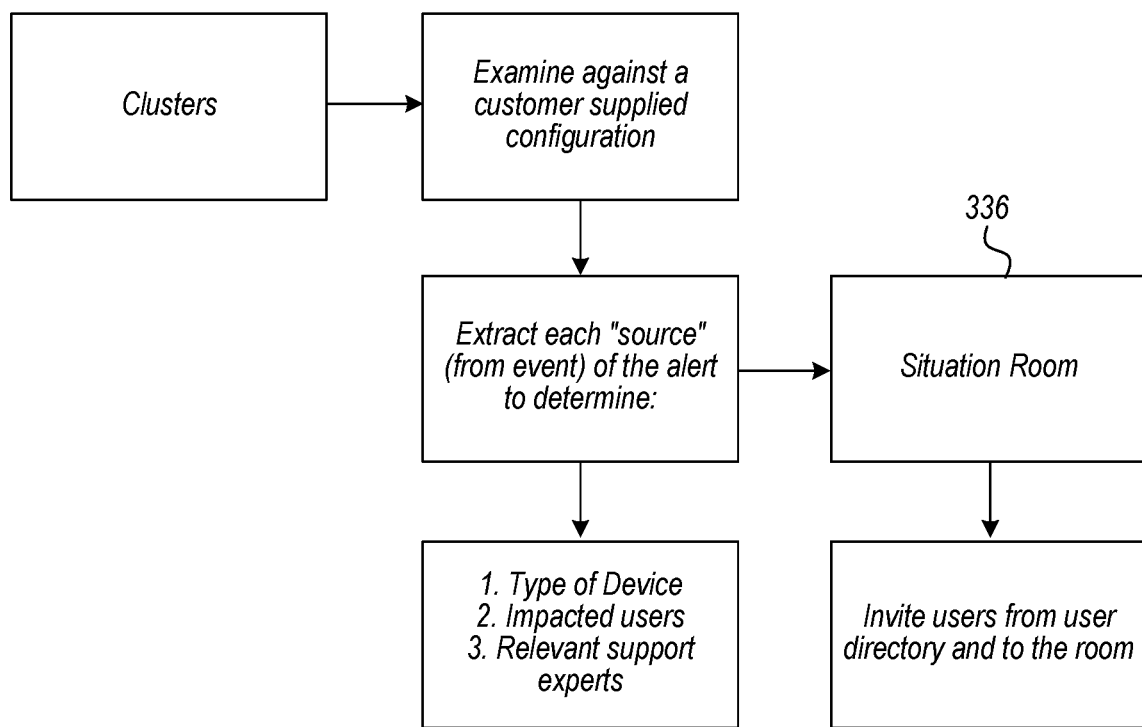
FIG. 12 is a schematic diagram of a processing system according to an embodiment.
Figure 19:
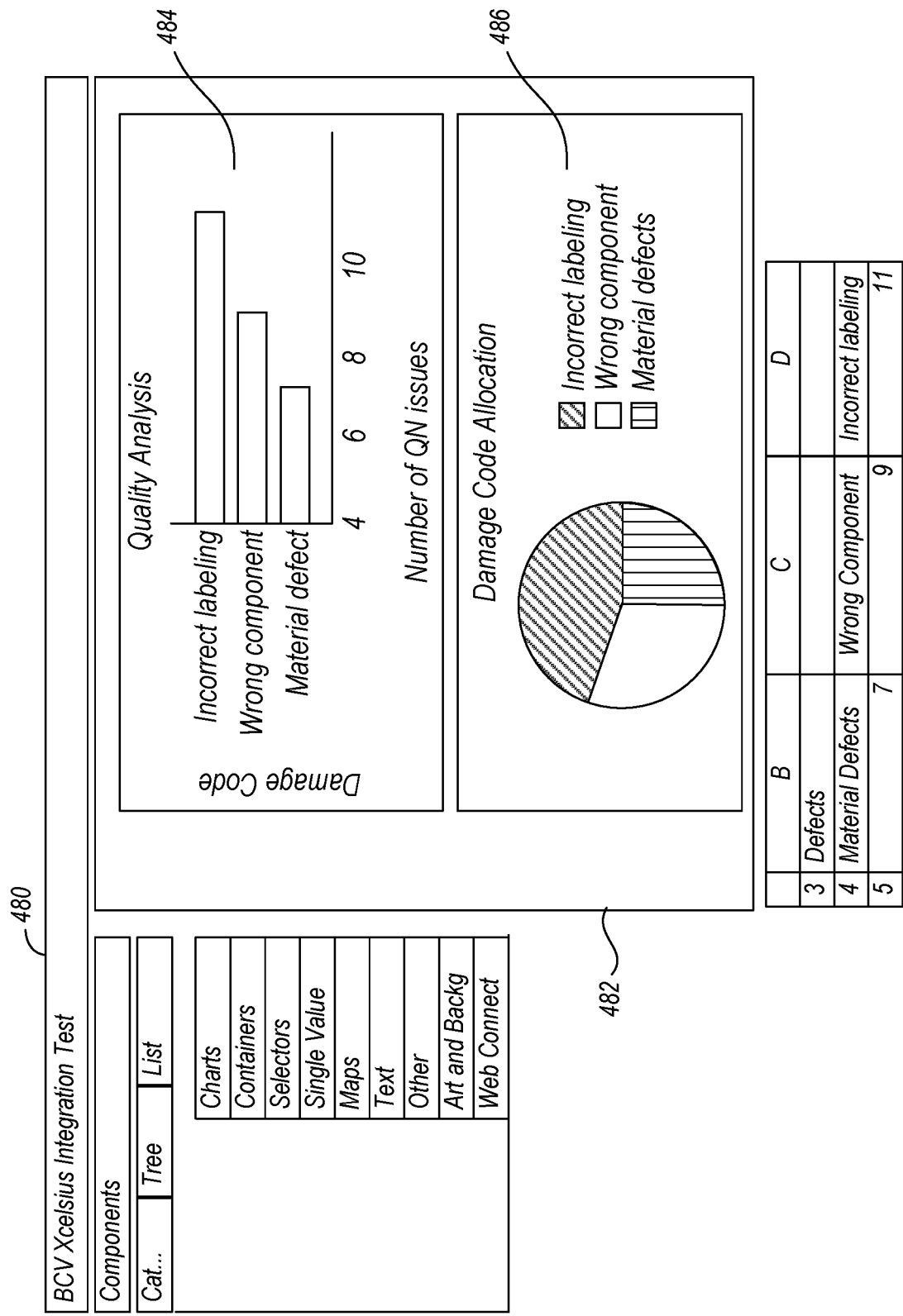
FIG. 19 is an example screen display showing the graphical display of the data using the dashboard configuration shown in FIGS. 16-18.

FIG. 19 shows a screen display 480 of the dashboard designer that may be used to design a dashboard display according to the system shown in FIG. 12. The dashboard designer may be executed by the dashboard design system 412. The dashboard may be created on the canvas 482. A dashboard design user may place the components from the component panel on the canvas 482. As shown in FIG. 19, the canvas 482 has a bar graph 484 and a pie chart 486 that are displayed in this example dashboard. The dashboard 480 shown in FIG. 19 is using example data from the spreadsheet shown at the bottom of FIG. 19. For example, the labels of the bar graph "Incorrect labeling", "Wrong component" and "Material defects" are from the spreadsheet shown below. In particular, the cell range from B4 to D5 440 was selected as input into the properties of the bar graph and the pie chart. Next, the data in the bar graph and the pie chart is received from cell range B5 to D5. In order to generate this dashboard the dashboard design user may associate various data fields with particular component properties.

FIG. 18 is a screen display of the dashboard external interface that can permit another software program to access the dashboard controls and display. The external interface connection 488 may allow data from the application system to be passed to a cell range of the dashboard or SWF file, using push technology. During the execution of the dashboard or runtime, data may be pushed or sent from the data source, based on the mapping, to the dashboard. In this embodiment, the data may be transferred in tabular form across an interface. In another embodiment the external interface connection 488 may allow the use of pull technology, where the data is pulled by the context viewer system 438. In another embodiment, during the configuration of the dashboard when the "Generate XC Fields" button is clicked, the defined data ranges will be pulled to the system 450, for example in FIG. 16. The external interface connection 488 may be configured using a definition tab 490, range name 492, range type, range 494 and access type properties. External interface connections allow a dashboard design user to expose selected data ranges relating to the dashboard display. The range name 492 is shown as Labels and the range 494 being assigned, "Table 1 !$B$4:$D$4" which is the cell range from B4 to D4. In this example embodiment, the labels from B4 to D4 will be used for mapping the Labels field. After specifying the data range, the dashboard design user may export the dashboard as a file, the file may be executed by various software program including business software.

FIG. 16 is a screen display that allows a user to choose a chart view in order to display a dashboard. In particular, the query view 496 is part of the context viewer application and includes various data types from a business analytics database. If the user chooses to view a chart, the user may select the chart view 498. After a user selects the chart view 498 then the user may be presented with a screen shown in FIG. 20.

FIG. 20 is an example screen display showing the data mapping for the dashboard configuration screen. Screen 510 shows a user interface where the user may select (using a pull down menu) the type of technology 512 the user plans to use for the chart view display. Here, the user may select the type of dashboard file that was created as the technology. Next, the file path 514 of the exported dashboard or SWF file may be specified. After choosing a SWF file, the user may select the "Upload file to repository" button in order to save a graphic file (SWF file) in the system 138. After selecting button "Generate XC Fields", may be the name of the dashboard external data ranges (e.g. "Damages" and "Labels" in FIG. 18). In the mapping shown in FIG. 18, the user may enter or browse for the name of data source (Query ID). For example, the Query ID shown in this example is "ZOK_QN". This entry is mapped against the data source that may be stored in the application data 146. The user may search for the Query Field ID, which is a specific field of data source Query ID (e.g. field "CODE TEXT" of Query ID "ZOK_QN" in the provided example). Creating this mapping allows the dashboard to utilize the data in the application data 446 or 430. As can be appreciated that programming in a textual or visual manner is not required and the user may create the dashboard, export the dashboard, map the fields and display the dashboard as shown in FIG. 21 using a graphical user interface that responds to a pointing device (e.g. mouse, pen or display device that is sensitive to touch or ocular movement).

Figure 21:
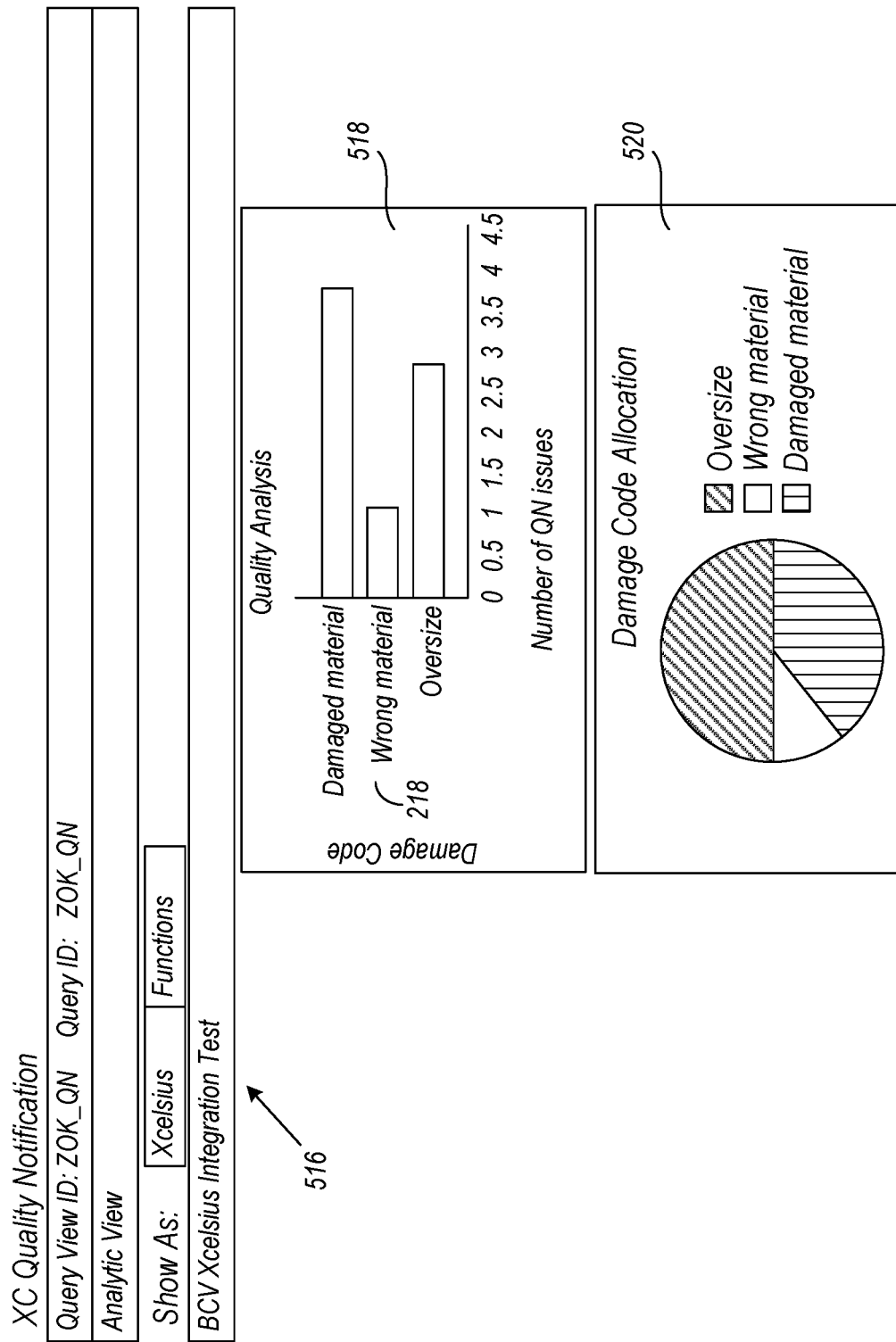
FIG. 21 illustrates one embodiment of a screen display showing the graphical display of the data using the dashboard configuration from FIGS. 19 and 20

FIG. 21 is an example screen display showing the graphical display of the data using the dashboard configuration from FIGS. 19 and 20. FIG. 21 shows a dashboard 516 that includes the bar graph 518 and pie chart 520. The labels and the value data in the bar and the pie charts 518 and 520 are from the business software and are different than the data used in FIG. 19. Therefore, the user can create a display of a dashboard in another application by using an external connection that may expose data fields to permit the visualization of any type of data.

The embodiments refer to a dashboard that may be a web-based or other technology based display on which real time data is collated, processed and displayed from multiple data sources that belong to one or more businesses. Other terms that may be used to describe a dashboard, include, digital dashboard, enterprise dashboard, business dashboard, executive dashboard, operational dashboard, BI dashboard, database dashboard, Web dashboard, performance dashboard, score card, KPI dashboard, metrics dashboard and so on. Dashboards may be designed to help any user monitor what's happening or has happened in the past visually or at a glance. Dashboards may provide the user a means to rapidly monitor the current status. Accordingly, dashboards must be designed to take advantage of the strengths of visual perception, cognition and work around or augment the user's weaknesses.

Embodiments can include a system for displaying data stored on computer readable non-transitory media. The system configured to access one or more data fields within a file. The file having been configured using an external connection adapter. The system may include a display computer system configured to map the accessed one or more data fields to data from one or more data sources, the mapping being performed based on a user input via a graphical user interface. In this embodiment, the system may be configured to display on the display computer system a dashboard according to the configuration setting stored in the file, the dashboard may show a graphical representation of the data from the one or more data sources and information from the one or more data fields.

In another embodiment, the dashboard includes dashboard display system that processes the data from the one or more data sources and displays a visual representation of the data in a graph or chart form. Alternatively or additionally, the dashboard includes a component that is modified by using a graphical user interface such that the dashboard display or components are modified.

In another embodiment, the file is generated by a first software program located in the dashboard design system that is configured to generate the dashboard. The display computing system may further comprise executing a second software program on the display computer system to retrieve the data from the one or more data sources and displaying the dashboard. The display computing system may include converting, using a generic adapter, the data from the one or more data sources into data structures that are compatible with a format of the graphic file.

In another embodiment the data is converted from the one or more data sources into data structures that are compatible with a format of the file using the external connection adapter. The file can be a short web format file that exposes one or more data fields that may be mapped to fields in one or more data sources. In another embodiment, the mapping may occur via a graphical user interface free of receiving textual programming code from the user.

In another embodiment, a computer-implemented method is stored on a computer readable media. Visualization software is integrated with a data processing application that includes configuring a dashboard display using a dashboard design system. The dashboard display can use one or more first data ranges from a spreadsheet as example data. An external connection adapter can be used to provide access to one or more first data ranges that are to be displayed in the dashboard display.

In other embodiments, the dashboard display is exported in a graphic file format. In certain embodiments, one or more first data ranges are accessed from the dashboard display using a display computing system. In one embodiment, one or more first data ranges are connected to one or more second data ranges from one or more data sources. The dashboard can display using data from the one or more second data ranges.

In one embodiment, the dashboard displays with the problem walls from clustering messages received from managed infrastructure 14 data can use a graphical user interface that is free from receiving textual or textual programming code from the client. In this embodiment the method may include processing place problem walls from clustering messages received from managed infrastructure 14 from the one or more data sources and displaying a visual representation of the data in a graph or chart form. This can include a method that includes a component that may be modified by using a graphical user interface that results in a modification of the dashboard display.

In one embodiment, a method is provided that includes a dashboard display generated by a first software program that generates a visual display. This can include, executing a second software program on the display computer system to retrieve the data from the one or more data sources and displaying the dashboard and the method may include converting, using a generic adapter, the data from the one or more data sources into data structures that are compatible with a format of the file.

In one embodiment, the exporting can include converting the place problem walls from clustering messages received from managed infrastructure 14 data from the one or more second data sources into data structures that are compatible with the graphic file format. In one embodiment, this can include converting using an external interface adapter. A graphic file format can be a short web format that allows a software to access the one or more first data ranges.

In another embodiment, a user interface system has an external connection adapter configured to provide access to one or more data fields within a file. As a non-limiting example, this can include a display computer system that maps using a graphical user interface the one or more data fields to data from one or more data sources. The display computer system can generate a dashboard display from a configuration in the file. In one embodiment, the display includes place problem walls from clustering messages received from managed infrastructure 14 data from one or more data sources and information from one or more data fields. A graphical user interface can be provided that is free of receiving textual programming code from the user.

In one embodiment, a first software executed on a display computer system that generates the dashboard in a visual graphic display. A second software program can be included to execute on the display computer system and retrieve the data from the one or more data sources and display the dashboard display. A generic adapter can be utilized to convert the data from the one or more data sources into one or more data structures that are compatible with a format of the file.

In one embodiment, a graphical user interface can modify a component and this can be used to modify the dashboard display.

In one embodiment, an external connection adapter converts the data from the one or more data sources into data structures that are compatible with a format of the file using the external connection adapter.

The logics can be machine-readable media for carrying or have machine-executable instructions or data structures stored thereon. The machine-readable media can be any available media that may be accessed by a general purpose or special purpose computer or other machine with a processor. As a non-limiting example, a variety of machine-readable media can be utilized, including but not limited to: RAM, ROM, EPROM. EEPROM, CD-ROM or other optical disk storage, magnetic disk storage or other magnetic storage devices, non-transitory computer readable media or non-transmissible computer-readable media or any other medium which may be used to carry or store desired program code in the form of machine-executable instructions or data structures and which may be accessed by a general purpose or special purpose computer or other machine with a processor. With the dashboard system, any such type of connection is termed a machine-readable medium. It will be appreciated that the machine-readable medium can include combinations of the preceding.

As non-limiting examples, with the dashboard system, machine-executable instructions can be: instructions and data which cause a general purpose computer, special purpose computer, or special purpose processing machines to perform a certain function or group of functions, and the like.

The dashboard system can be implemented by a program product including machine-executable instructions, such as program code. As a non-limiting example, this can be program modules executed by machines in networked environments. As non-limiting examples, the program modules can include routines, programs, objects, components, data structures, and the like, that perform particular tasks or implement particular abstract data types. As non-limiting examples the dashboard system can utilize, machine-executable instructions, associated data structures, and program modules as program code for executing steps of the methods disclosed herein.

As non-limiting examples, the dashboard system can be executed in a networked environment using logical connections to one or more remote computers having processors. AS non-limiting examples, suitable network computing environments can be, computers, including personal computers, mobile devices, multi-processor systems, microprocessor-based or programmable consumer electronics, network PCs, minicomputers, mainframe computers, and the like.

In certain embodiments, the dashboard system can be executed in distributed computing environments where tasks are performed by local and remote processing devices that are linked. As non-limiting examples, the linking can be by, hardwired links, wireless links, combination of hardwired or wireless links, and the like, through a communications network. In one embodiment, computing environment, program modules may be located in both local and remote memory storage devices.

As a non-limiting example, one embodiment of a system for implementing the overall system or portions of the embodiments can include a general purpose computing computers in the form of computers, including a processing unit, a system memory or database, and a system bus that couples various system components including the system memory to the processing unit. The database or system memory cam include read only memory (ROM) and random access memory (RAM).

As a non-limiting example, the database can be a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media, and the like.

As a non-limiting example, the drives and their associated machine-readable media can be used to provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

Figure 22:
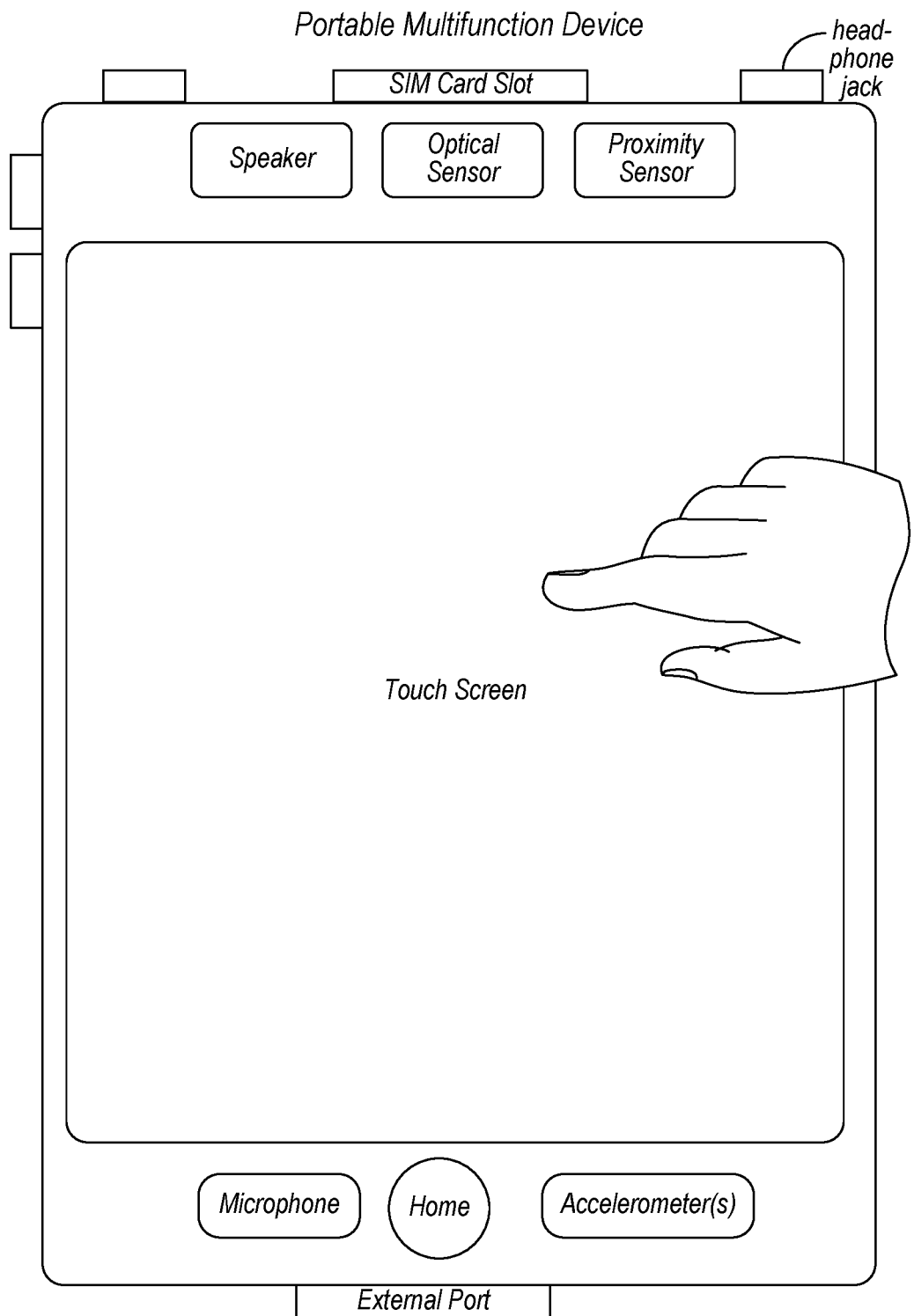
FIGS. 22 through 24 illustrate one embodiment of a mobile device managed infrastructure that can be used with the clustering system of the present invention.
Figure 23:
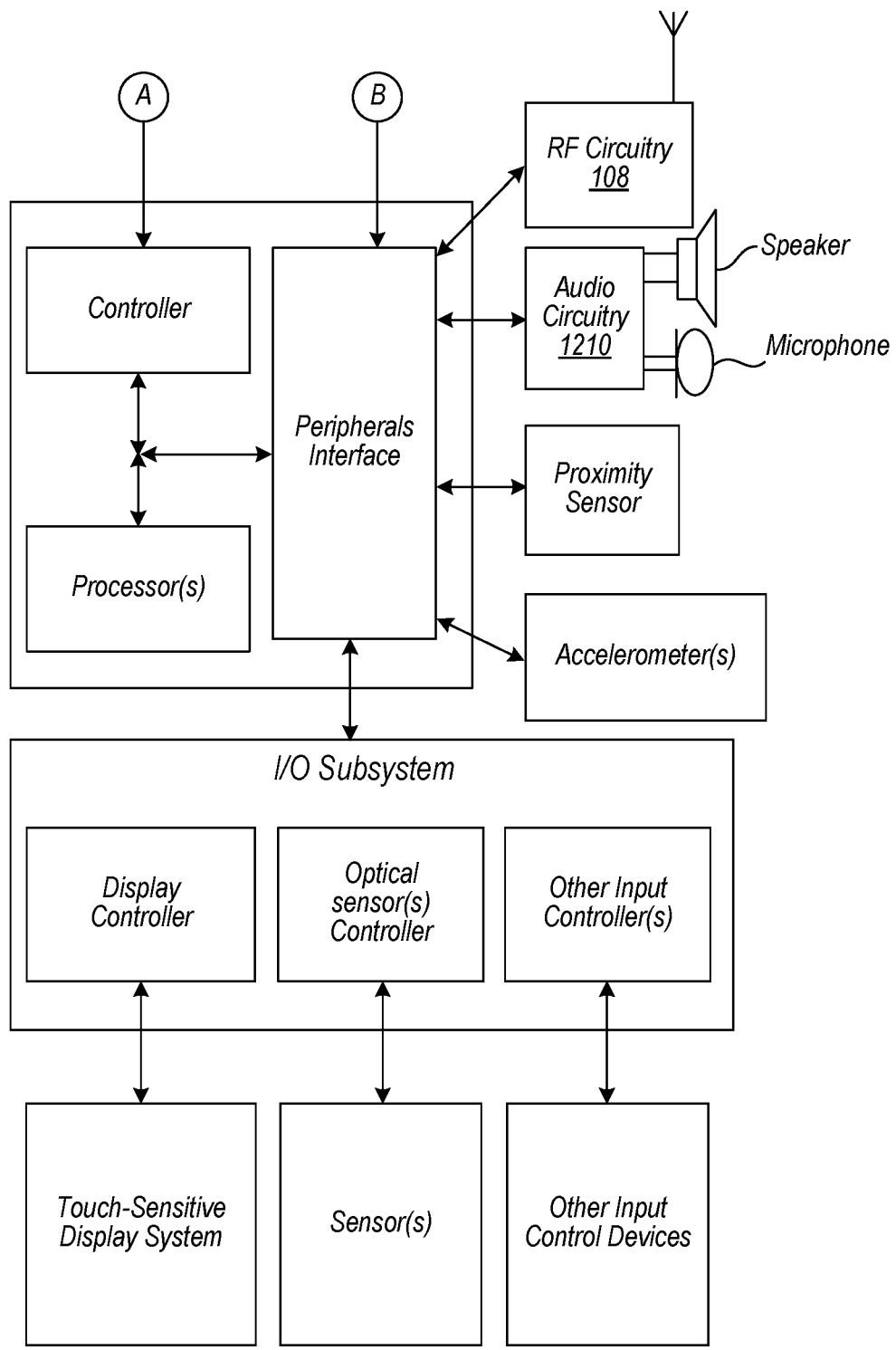
Figure 24:
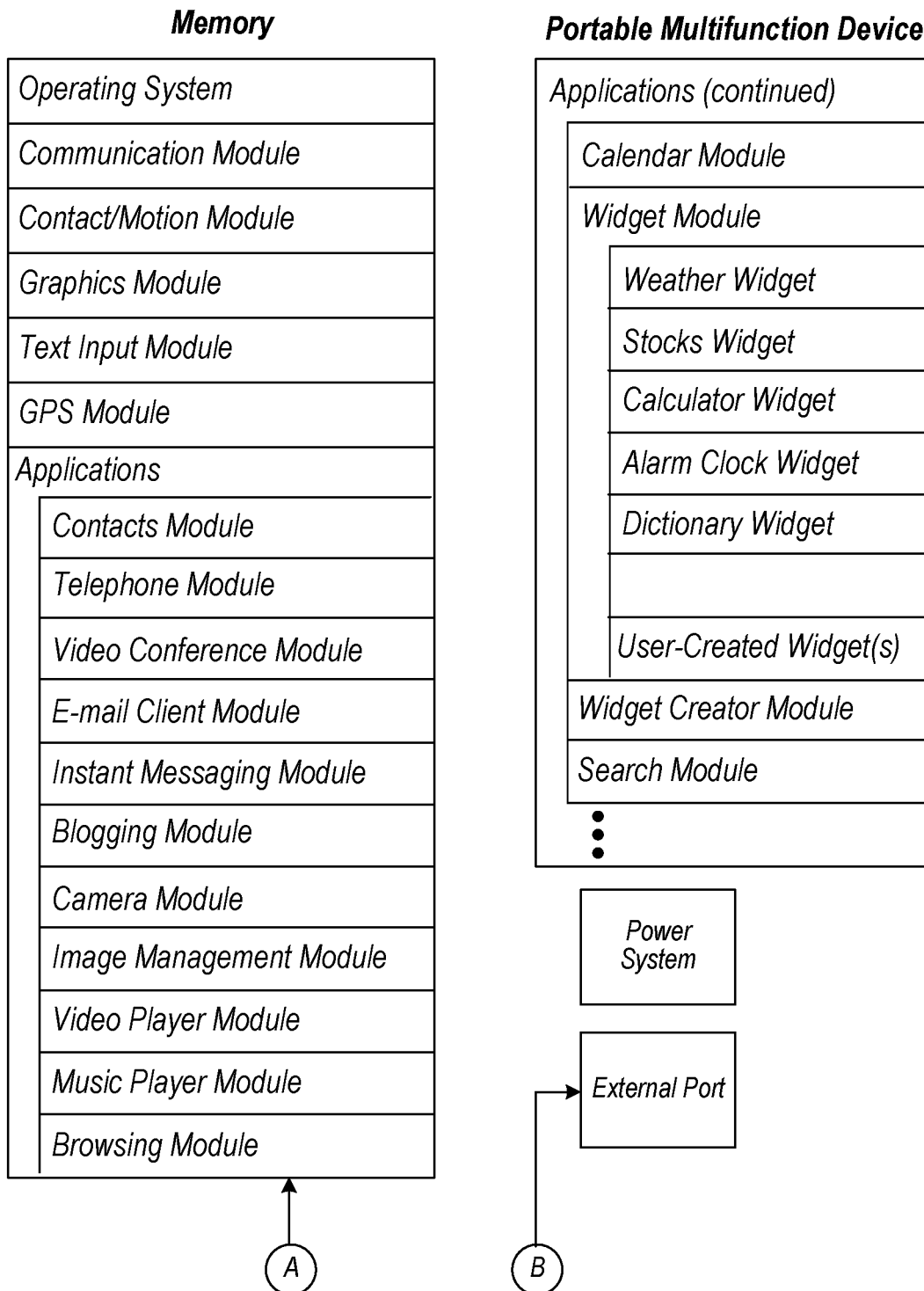

Referring to FIGS. 22 through 24, the mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 21 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA). BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP). Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 20). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers 1 receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006: (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264. "Gestures For Touch Sensitive Input Devices." filed Jan. 31, 2005; (5) U.S. patent application Ser. No. 11/038,590, "Mode-Based Graphical User Interfaces For Touch Sensitive Input Devices." filed Jan. 18, 2005; (6) U.S. patent application Ser. No. 11/228,758, "Virtual Input Device Placement On A Touch Screen User Interface." filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737. "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including not limited to optical sensors. FIGS. 22-24 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839. "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251. "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names: providing telephone numbers or e-mail addresses to initiate and/or facilitate communications by telephone, video conference, e-mail, or IM; and so forth.

In one embodiment a feedback signalizer functor is provided that is a signalizing event analyzer which responds to user interactions with already formed situations. It then learns how to replicate the same situation when new alerts reoccur, or, creates similar situations. In one embodiment the feedback signalizer functor is a supervised machine learning approach to train a signalizer functor to reproduce a situation at varying degrees of precision. As a non-limiting example, this is accomplished by the use of neural networks, in particular a feed forward neural net with the standard configuration of an input layer, configurable hidden layers. This can be considered as deep learning with a single output layer. In one embodiment the use case being addressed by the feedback signalizer functor is to respond to a configurable set of queues to learn and unlearn situations. In one embodiment the feedback signalizer functor is configured to run in farms.

In one embodiment the feedback signalizer functor listens on the sig journal topic for audited actions on a situation. These actions are collected together into a set of collections of actions, configurable in two parameters: learn_queues and unlearn_queues. As a non-limiting example the following example configuration defines the actions for learn_queues and unlearn_queues:

learn_queues
:["manual_create","mergecreate","splitcreate","annotated","diagnosed","closed","refined"],
manual_create, the creation of a situation where alerts are brought together in a situation,
merge_create is the creation of a new situation by merging two situations. The learn_queue is on the created situation, not on the two situations that are merged together,
split_create is when you create a new situation by splitting an existing situation, and it is the created situations that are learnt,
annotated is any addition to either a discussion thread or comment, or, the setting of a situation description,
diagnosed indicates a tool has run,
closed relates to whether a situation is closed or resolved,
refined is when alerts are added to or removed alerts from a situation,
unlearn_queues: ["split" ], If this action is taken on a given situation, the neural net, which is created by the learn_queues for the situation is discarded. Any action can be either a learn queue or an unlearn queue.

In one embodiment as part of the feedback signalizer functor a small Java library, neural, exists to encapsulate the neural network. The neural network takes an alert as its input. When a situation is learned, the collection of alerts in that situation is presented to the neural network, which then learns the contents of the situation. In one embodiment the neural network can be configured by selecting any attribute of an alert as shown in the following example configuration:
inputs: ["source," "description," "severity," "manager." ]

In one embodiment if the element of an alert is not a string, it is converted to a string for consideration in the neural network. In one embodiment the neural network is set up to have an input node for each attribute of an alert. In one embodiment a brain configuration section is used to set up the precise characteristics of the neural network that is used to learn the situation. The following is a non-limiting example of how this can be achieved:

neurons:7,
layers:2,
learning_rate:0.1,
activation_func:"Hyperbolic",
epochs:500,
precision:0.92,
exact_match:false
where:
neurons provide the number of neuron's in the hidden layer. The neural network created by neurons with a value of 7 is shown in figure one.

Epochs, precision and exact match relate to the number of times a network is trained which is the process of presenting the alerts and then back propagating and adjusting the network configuration to achieve 1.0 and −1.0 as the output layer, epochs is the maximum number of iterations that you will back propagate against a single alert to try and achieve the stated precision. In the embodiment above it is 0.92. As a non-limiting example this would be trained if, presenting an alert to the neural network gave a value of 0.92 on the True and −0.92 on the False. It will iterate until completed, and only terminate the iteration on meeting the error goal, or, exceeding the number of epochs or iteration steps. Exact match parameter is a technical override to the neural network meaning that an alert, which is not used for training, does not provide a positive value for inclusion. In this embodiment because it does not provide a positive value it is clustered. A perfect recall of all the alerts is not achieved. As a non-limiting example, exact_match can provide 100% precision and it can also have less than 100% recall.

Precision is the number of true positives divided by the total number of true positives and false positives. As a non-limiting example when there are nine alerts in the situation that were part of the training, and one alert is not part of the training, the precision is 0.9 (9 dived by (9+1). The number of alerts divided by the number of alerts that should have received in the situation. As a non-limiting example, when it is trained on five alerts and four alerts are received in the situation, the recall is 80% or 0.8.

Learning Rate is key configurations in the training. In this example the learning rate is set at 0.1, and controls how fast the neural network converges on training An activation_function can be "Sigmoid", "Hyperbolic" or "Sine" and is not case sensitive. It changes the function used to propagate the value of a neuron to the next layer, by choosing between functions 2, 3 and 4 in the equation below.

In one embodiment if an alert is a member of a situation the neural network takes the alert input for the alert and it is passed through the neural network. As a non-limiting example in classic back propagation training the value of the True output node is optimized to 1.0 and the false output node is −1.0.

Figure 25:
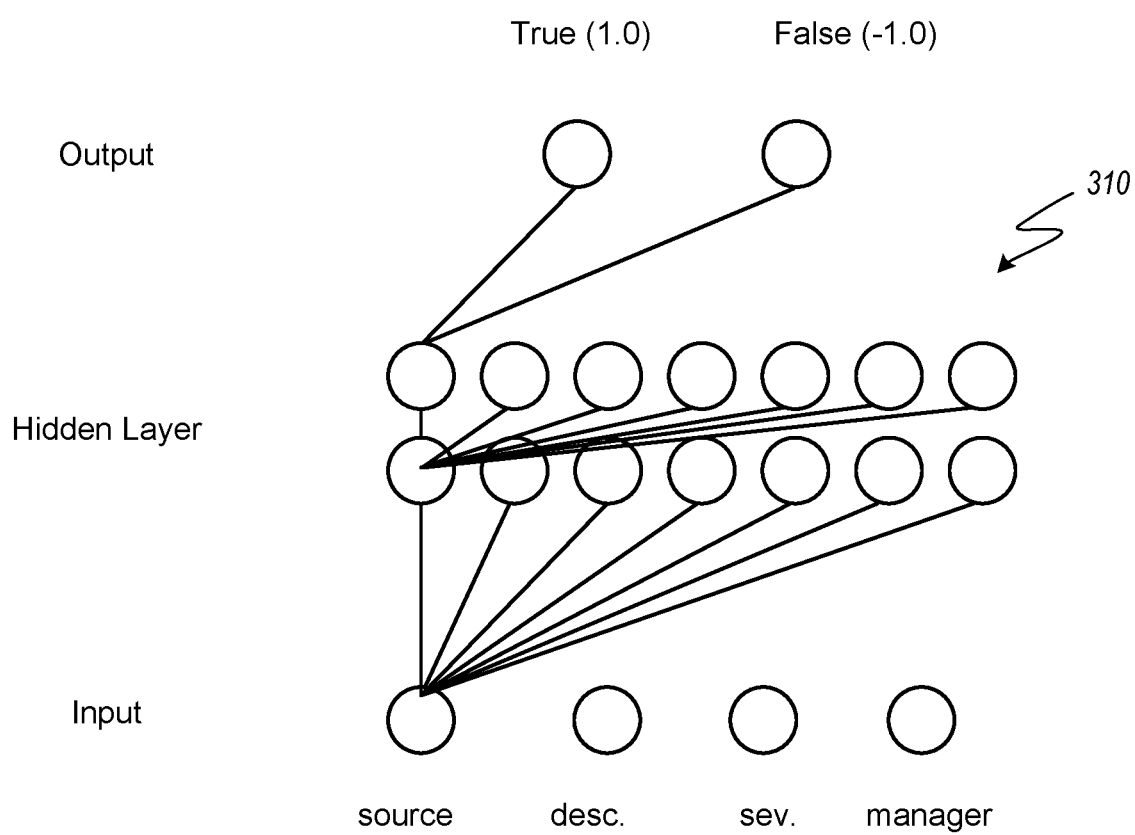
FIG. 25 illustrates one embodiment of a network, which as a non-limiting example is a neural network.

FIG. 25 illustrates one embodiment of a network, which as a non-limiting example is a neural network 310. As a non-limiting example every input layer is connected to every neuron on a first hidden layer. Every neuron on a hidden layer is connected to neurons on the next hidden layer, and every neuron on the last layer is connected to both True and False. The connections are a function that takes the numerical value submitted to the neuron and converts it into a value that it propagates onto the next neuron up the layer as follows:

$$\text{output(neuron)} = \sum_{\text{inputs}} w_i \times \text{input}_i$$

$$f(x) = 1.0 - \frac{1}{1 - \exp(-\text{output(neuron)})}$$

$$f(x) = \tanh(\text{output(neuron)})$$

$$f(x) = \sin(\text{output(neuron)})$$

In one embodiment The value of the neuron is equal to the sum of a weight factor times the input value from the (ith) input node, or, proceeding layer input node equals the value of the neuron. This value is passed to a function that propagates up to the next layer in the neural net.

As a non-limiting example for the activation function, activation_func, there can be three choices: Sigmoid, a standard function that is one minus the exponential of the value of the neuron; Hyperbolic, that uses the hyperbolic tangent, or, tanh of the value, which passes it on, and. Sine that uses a trigonometric sin of the value. A slight technicality is that all the neural nets are symmetric as opposed to asymmetric.

The Sigmoid function can sometimes tend to blur values and can be less precise than the other two activation functions. The Hyperbolic function is more likely to resolve similar alerts, and Sine works better with random data. In one embodiment if the alerts in a situation that is in the process of learning the alerts have little similarity, the Sine function produces better results when recalling that situation, but is less precise. The Sigmoid function produces better precision but has a poorer recall. In one embodiment a back propagation is standard back propagation and the learning rate is the small positive constant used to perform the gradient descent method of solving for the weights in Equation 1. In the FIG. 20 embodiment, with four input nodes, two layers of seven, and two output nodes, there are 91 interconnections between the neurons, ((7*7) nodes+ (2*7) nodes+(4*7) nodes)=91. In this embodiment there are 91 weights that characterize the state of the neural network. This can be considered as a form of training by calculating 91 floating point numbers. In this embodiment a unique signature of 91 floating-point numbers are respected as an arbitrary collection of alerts that for training.

Figure 26:
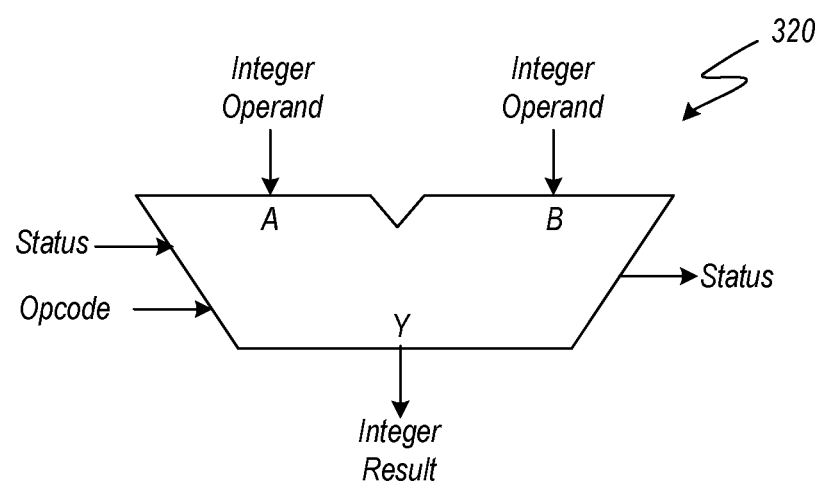
FIG. 26 illustrates one embodiment of a floating point unit.

As illustrated in FIG. 26 in one embodiment a floating point unit (FPU) 320 performs floating point calculations. In one embodiment floating point arithmetic logic instructions are retrieved from memory of system 10 and or 310 that are then stored in a system 10 and or 310 memory. In one embodiment a BEEFY FPU 320 is used.

In one embodiment the FPU 320 is included in a processor of the system 10 and or 310. In one embodiment the FPU 320 is a stand-alone unit apart for a processor of the system 10 and or 310. In one embodiment the FPU 320 executes floating point arithmetic logic instructions by retrieving them from a memory of the system 10 and or 310. In one embodiment the FPU 320 executes floating point arithmetic logic instructions by retrieving them from a memory of the system 10 and or 310 that are then stored in one or more system 10 and or 310 memory.

In one embodiment the FPU 320 includes one or more of a: floating point adder, multiplier and comparator. As a non-limiting example the FPU 320 performs one or more of: exponent subtraction; subtraction of the exponents to form an absolute difference $|E_a-E_b|=d$; alignment; significand addition; addition or subtraction according to an effective operation that is a function of an opcode and the signs of operands; conversion that converts a significand result, when negative, to a signmagnitude representation; leading-one detection; normalization; and rounding.

In one embodiment a control unit of a processor carries out stored program instructions relative to the FPU 320. In one embodiment the control unit communicates with the ALU and memory. In one embodiment input signals are propagated through the FPU 320 and a resulting performed operation is a FPU 320 output. In one embodiment the FPU 320 output includes a data word and status information of the event. In one embodiment the status information is a rating of a significance of the event.

In one embodiment the input into the neural network is a conversion of a string into a floating-point number because a value between +1.0 and −1.0 is needed at the output layer. In one embodiment this is achieved by using a version of the standard simhash algorithm that is used to convert a string into a floating-point number and then normalize. Simhash is used where similar items are hashed to similar hash values that is the bitwise hamming distance between hash values.

Example 3 irb(main):003:0>p1.simhash
=>851459198
00110010110000000011110001111110
irb(main):004:0>p2.simhash
=>847263864
00110010100000000011100001111000
irb(main):002:0>p3.simhash
=>984968088
In the preceding the hamming distance of the similar items (p1,p2)=4
whereas (p1,p3)=16 and (p2,p3)=12
The simhash of a phrase is calculated as follow . . .
pick a hashsize, let's say 32 bits
let V=[0]*32 # (i.e. 32 zeros)
break the phrase up into features
irb(main):003:0>'the cat sat on the mat', shingles
=>#<Set: {"th", "he", "e". "c", "ca", "at". "t ",
"s". "sa", "o". "on". "n", "t", "m". "ma"}>
hash each feature using a normal 32-bit hash algorithm
"th".hash=−502157718
"he".hash=−369049682
for each hash if biti of hash is set then add 1 to V[i]
if biti of hash is not set then take 1 from V[i]
simhash biti is 1 if V[i]>0 and 0 otherwise simhash is useful because if the simhash bitwise hamming distance of two phrases is low then their jaccard coefficient is high As a non-limiting example the simhash function calculates a 64 bit integer for a string, which is then normalized, so, the value is between 1.0 and −1.0 and created by dividing the smiths value by the max value of a signed long integer. The simhash function is designed so that lexicographically similar strings have similar simhash values. The simhash algorithm, takes the string, breaks it into individual and pairs of characters, and, then calculates for each of those 2n−1 substrings, an md5 hash for each of the components before going through a process of progressive XOR'ing of the md5 hashes together. This culminates in an array that is used to collapse down into an integer by bit setting.

In one embodiment test and real world data produce good results so that similar strings such as "server6" and "server7" give similar simhash values. The neural network provides reliable results against both artificial and real world data.

As a non-limiting example a standard configuration can be as follows:
name: "Feedback",
classname:"CFeedback",
run_on_startup: false,
process_output_of: "AlertBuilder,
membership_limit: 1,
scale_by_severity: false,
entropy_threshold:0.0,
single_matching: true,
activation_func: "Hyperbolic"

In one embodiment the standard configuration is back-ended to an alert builder. It can run in both standalone and in chained mode as it listens on the journal function and retrieves its own data from the database.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. An event clustering system, comprising:
   an extraction engine in communication with a managed infrastructure;
   a signalizer engine that includes one or more of an NMF engine, a k-means clustering engine and a topology proximity engine, the signalizer engine determining one or more common characteristics or features from events, the signalizer engine using the common features of events to produce clusters of events relating to the failure or errors in the managed infrastructure, where membership in a cluster indicates a common factor of the events that is a failure or an actionable problem in the physical hardware managed infrastructure directed to supporting the flow and processing of information;
   a floating point unit (FPU) that performs floating point calculations;
   wherein in response to production of the clusters one or more physical changes in a managed infrastructure hardware is made, where the hardware supports the flow and processing of information.

2. The system of claim 1, wherein the FPU is included in a processor of the system.

3. The system of claim 1, wherein the FPU is a standalone unit apart for a processor of the system.

4. The system of claim 1, wherein the FPU executes floating point arithmetic logic instructions by retrieving them from a memory of the system.

5. The system of claim 2, wherein the FPU executes floating point arithmetic logic instructions by retrieving them from a memory of the system that are then stored in a system memory.

6. The system of claim 1, wherein the FPU includes one or more of a: floating point adder, multiplier and comparator.

7. The system of claim 1, wherein the FPU performs one or more of: exponent subtraction; subtraction of the exponents to form an absolute difference $IE\_a-E\_bl=d$; alignment: significand addition; addition or subtraction according to an effective operation that is a function of an opcode and the signs of operands; conversion that converts a significand result, when negative, to a signmagnitude representation; leading-one detection; normalization; and rounding.

8. The system of claim 1, further comprising:
   a control unit of a processor that carries out stored program instructions relative to the FPU.

9. The system of claim 8, wherein the control unit communicates with the ALU and memory.

10. The system of claim 1, wherein input signals are propagated through the FPU and a resulting performed operation is a FPU output.

11. The system of claim 10, wherein the FPU output includes a data word and status information of the event.

12. The system of claim 1, wherein the status information is a rating of a significance of the event.

13. The system of claim 1, wherein the extraction engine is configured to receive messages from the managed infrastructure and produce events that relate to the managed infrastructure.

14. The system of claim 2, wherein the extraction engine converts the events into words and subsets used to group the events into clusters that relate to failures or errors in the managed infrastructure.

15. The system of claim 1, wherein managed infrastructure hardware includes at least one of: computers, network devices, appliances, mobile devices, applications, connections of any of the preceding, and text or numerical values from which those text or numerical values which indicate a state of any hardware of the managed infrastructure.

16. The system of claim 1, wherein the managed infrastructure generates data that includes attributes.

17. The system of claim 5, wherein, the data that includes attributes is selected from at least one of: time, source a description of the event, and textural or numerical values indicating a state of the managed infrastructure.

18. The system of claim 1, wherein physical changes made to the managed infrastructure hardware that create physical and virtual links between the managed infrastructure and a system server.

19. The system of claim 7, wherein physical changes made to the managed infrastructure includes changes to links from the server to a system high speed storage.

20. The system of claim 5, wherein managed infrastructure generated data is selected from at least one of, time, source a description of: an event, textural or numerical values indicating a state of the managed infrastructure.

21. The system of claim 1, wherein the extraction engine communicates with the managed infrastructure across an IP network at a high speed connection and with low latency.

22. The system of claim 10, wherein the high speed connection is in the gigabits and low latency is in the microseconds.

23. The system of claim 10, wherein the high speed connection is at least 1 gigabit, and low latency is at least 10 microseconds.

24. The system of claim 1, wherein the extraction engine includes one or more of: a central processor, a main memory, an input/output controller, an interface, a display, and a storage device.

25. The system of claim 14, wherein the storage device is configured to communicate through a system bus or similar architecture.

26. The system of claim 1, wherein the system includes a software system that can be included in memory.

27. The system of claim 1, wherein the software system includes one or more of an operating system and a shell or interface.

28. The system of claim 14, wherein application software of the system is transferred from the storage device.

29. The system of claim 1, wherein the extraction engine breaks event messages into subsets of messages that relate to failures or errors in managed infrastructure.

30. The system of claim 1, wherein the extraction engine breaks events into subsets of messages relative to failure or errors in a managed infrastructure via a message input mechanism.

31. The system of claim 21, wherein the extraction engine breaks the events into subsets of messages and parses machine elements from the managed infrastructure.

32. The system of claim 22, wherein the machine elements are machine messages.

33. The system of claim 1, wherein the extraction engine receives managed infrastructure data and produces events as well as populates an entropy database.

34. The system of claim 1, wherein the extraction engine populates the entropy database with a dictionary of event entropy that can be included in an entropy database.

35. The system of claim 25, wherein the extraction engine populates the entropy database with the use of a token counter.

36. The system of claim 26, wherein the entropy database is generated with word and subtexts.

37. The system of claim 26, wherein the entropy database is generated using Shannon Entropy.

38. The system of claim 23, wherein the entropy database is configured to normalize events across data and/or datasets from the managed infrastructure.

39. The system of claim 28, wherein normalized entropy for events is mapped from a common, 0.0 and a non-common, 1.0.

40. The system of claim 23, wherein entropy is assigned to alerts.

41. The system of claim 23, wherein entropy for each event is retrieved from an entropy dictionary.

42. The system of claim 31, wherein entropy for each event is retrieved from an entropy dictionary as it enters the system.

43. The system of claim 23, wherein the entropy database is generated with word and/or subtexts.

44. The system of claim 1, wherein a network is created that includes a plurality of nodes in a graph.

45. The system of claim 34, wherein a non-directed graph is used to calculate graph entropy for each node in the graph.

46. The system of claim 34, wherein the graph is a non-directed graph that calculates graph entropy for each node in the graph.

47. The system of claim 37, wherein graph entropy is calculated using the following: (i) source data is used to calculate graph data; (ii) non-directed graph is used to calculate a number of links and a clustering coefficient of a node; and (iii) a number of links and clustering coefficient of the node together with the total number of links in the graph is then used to calculate an entropy value for each node.

48. The system of claim 37, wherein an N event value is attached to every event of the entropy graph of a source node.

49. The system of claim 1, wherein entropy values are used as a cutoff to ignore events from unimportant nodes to classify events.

50. The system of claim 1, wherein embedded agents in hardware components gather attributes to managed infrastructure health to generate data that includes attributes 54.

\* \* \* \* \*